US008154804B2

(12) United States Patent
McGinn et al.

(10) Patent No.: US 8,154,804 B2
(45) Date of Patent: Apr. 10, 2012

(54) ELECTRO-OPTIC LENSES FOR CORRECTION OF HIGHER ORDER ABERRATIONS

(75) Inventors: Joseph Thomas McGinn, Flemington, NJ (US); Dwight P. Duston, Laguna Niguel, CA (US); Anthony Van Heugten, Sarasota, FL (US)

(73) Assignee: e-Vision Smart Optics, Inc., Roanoke, VA (US)

( * ) Notice: Subject to any disclaimer, the term of this patent is extended or adjusted under 35 U.S.C. 154(b) by 0 days.

(21) Appl. No.: 12/410,889

(22) Filed: Mar. 25, 2009

(65) Prior Publication Data
US 2009/0279050 A1 Nov. 12, 2009

Related U.S. Application Data

(63) Continuation-in-part of application No. 12/135,587, filed on Jun. 9, 2008, now abandoned.

(60) Provisional application No. 61/039,181, filed on Mar. 25, 2008.

(51) Int. Cl.
*G02C 7/02* (2006.01)
*G02C 7/06* (2006.01)
*G02B 3/12* (2006.01)
*G02B 3/14* (2006.01)
*G02F 1/01* (2006.01)

(52) U.S. Cl. ........ 359/666; 359/665; 359/279; 351/159; 351/168; 351/169

(58) Field of Classification Search .................. 359/319, 359/665–667, 820, 642; 351/159, 163, 168; 349/13–14
See application file for complete search history.

(56) References Cited

U.S. PATENT DOCUMENTS

| 2,437,642 | A | 3/1948 | Henroleau |
| 2,576,581 | A | 11/1951 | Edwards |
| 3,161,718 | A | 12/1964 | DeLuca |
| 3,245,315 | A | 4/1966 | Marks et al. |
| 3,248,460 | A | 4/1966 | Naujokas |
| 3,309,162 | A | 3/1967 | Kosanke et al. |
| 3,614,215 | A | 10/1971 | Mackta |
| 3,738,734 | A | 6/1973 | Tait et al. |
| 3,791,719 | A | 2/1974 | Kratzer et al. |

(Continued)

FOREIGN PATENT DOCUMENTS
CN 89113088 10/2001
(Continued)

OTHER PUBLICATIONS

Bird, J. O. Electrical Circuit Theory and Technology. Oxford: Newnes, 2007. p. 510. Print.*

(Continued)

*Primary Examiner* — Darryl J Collins
*Assistant Examiner* — Zachary Wilkes
(74) *Attorney, Agent, or Firm* — Michael Haynes PLC; Michael N. Haynes

(57) ABSTRACT

A lens is presented in which the lens includes a substrate and an electrode layer. The electrode layer is positioned upon the substrate. The electrode layer has radially alternating rings of electrodes and resistive material. When voltage is applied across two adjacent electrodes the profile of the electric field therebetween is linear. When voltage is applied to the rings of electrodes, the optical phase profile of the lens closely approximates the optical phase of ideal spherical aberration correction.

26 Claims, 12 Drawing Sheets

U.S. PATENT DOCUMENTS

| | | |
|---|---|---|
| 4,062,629 A | 12/1977 | Winthrop |
| 4,174,156 A | 11/1979 | Glorieux |
| 4,181,408 A | 1/1980 | Senders |
| 4,190,330 A | 2/1980 | Berreman |
| 4,190,621 A | 2/1980 | Greshes |
| 4,264,154 A | 4/1981 | Petersen |
| 4,279,474 A | 7/1981 | Belgorod |
| 4,300,818 A | 11/1981 | Schachar |
| 4,320,939 A | 3/1982 | Mueller |
| 4,373,218 A | 2/1983 | Schachar |
| 4,395,736 A | 7/1983 | Fraleux |
| 4,418,990 A | 12/1983 | Gerber |
| 4,423,929 A | 1/1984 | Gomi |
| 4,457,585 A | 7/1984 | DuCorday |
| 4,461,550 A | 7/1984 | Legendre |
| 4,466,703 A | 8/1984 | Nishimoto |
| 4,466,706 A | 8/1984 | Lamothe, II |
| 4,529,268 A | 7/1985 | Brown |
| 4,564,267 A | 1/1986 | Nishimoto |
| 4,572,616 A | 2/1986 | Kowel et al. |
| 4,577,928 A | 3/1986 | Brown |
| 4,601,545 A | 7/1986 | Kern |
| 4,609,824 A | 9/1986 | Munier et al. |
| 4,712,870 A | 12/1987 | Robinson et al. |
| 4,756,605 A | 7/1988 | Okada et al. |
| 4,772,094 A | 9/1988 | Sheiman |
| D298,250 S | 10/1988 | Kildall |
| 4,787,733 A | 11/1988 | Silva |
| 4,787,903 A | 11/1988 | Grendahl |
| 4,795,248 A | 1/1989 | Okada et al. |
| 4,813,777 A | 3/1989 | Rainville et al. |
| 4,818,095 A | 4/1989 | Takeuchi |
| 4,836,652 A | 6/1989 | Oishi et al. |
| 4,842,400 A | 6/1989 | Klein |
| 4,869,588 A | 9/1989 | Frieder et al. |
| 4,873,029 A | 10/1989 | Blum |
| 4,880,300 A | 11/1989 | Payner et al. |
| 4,890,903 A | 1/1990 | Treisman et al. |
| 4,904,063 A | 2/1990 | Okada et al. |
| 4,907,860 A | 3/1990 | Noble |
| 4,909,626 A | 3/1990 | Purvis et al. |
| 4,919,520 A | 4/1990 | Okada et al. |
| 4,921,728 A | 5/1990 | Takiguchi |
| 4,927,241 A | 5/1990 | Kuijk |
| 4,929,865 A | 5/1990 | Blum |
| 4,930,884 A | 6/1990 | Tichenor et al. |
| 4,944,584 A | 7/1990 | Maeda et al. |
| 4,945,242 A | 7/1990 | Berger et al. |
| 4,952,048 A | 8/1990 | Frieder et al. |
| 4,952,788 A | 8/1990 | Berger et al. |
| 4,955,712 A | 9/1990 | Barth et al. |
| 4,958,907 A | 9/1990 | Davis |
| 4,961,639 A | 10/1990 | Lazarus |
| 4,968,127 A | 11/1990 | Russell et al. |
| 4,981,342 A | 1/1991 | Fiala |
| 4,991,951 A | 2/1991 | Mizuno et al. |
| 5,015,086 A | 5/1991 | Okaue et al. |
| 5,030,882 A | 7/1991 | Solero |
| 5,050,981 A | 9/1991 | Roffman |
| 5,066,301 A | 11/1991 | Wiley |
| 5,067,795 A | 11/1991 | Senatore |
| 5,073,021 A | 12/1991 | Marron |
| 5,076,665 A | 12/1991 | Petersen |
| 5,089,023 A | 2/1992 | Swanson |
| 5,091,801 A | 2/1992 | Ebstein |
| 5,108,169 A | 4/1992 | Mandell |
| 5,114,628 A | 5/1992 | Hofer et al. |
| 5,130,856 A | 7/1992 | Tichenor et al. |
| 5,142,411 A | 8/1992 | Fiala |
| 5,147,585 A | 9/1992 | Blum |
| 5,150,234 A | 9/1992 | Takahashi et al. |
| 5,171,266 A | 12/1992 | Wiley et al. |
| 5,178,800 A | 1/1993 | Blum |
| 5,182,585 A | 1/1993 | Stoner |
| 5,184,156 A | 2/1993 | Black et al. |
| 5,200,859 A | 4/1993 | Payner et al. |
| 5,208,688 A | 5/1993 | Fergason et al. |
| 5,219,497 A | 6/1993 | Blum |
| 5,229,797 A | 7/1993 | Futhey et al. |
| 5,229,885 A | 7/1993 | Quaglia |
| 5,231,430 A | 7/1993 | Kohayakawa |
| 5,239,412 A | 8/1993 | Naka et al. |
| D342,063 S | 12/1993 | Howitt et al. |
| 5,305,028 A | 4/1994 | Okano |
| 5,306,926 A | 4/1994 | Yonemoto |
| 5,324,930 A | 6/1994 | Jech, Jr. |
| D350,342 S | 9/1994 | Sack |
| 5,352,886 A | 10/1994 | Kane |
| 5,359,444 A | 10/1994 | Piosenka et al. |
| 5,375,006 A | 12/1994 | Haas |
| 5,382,986 A | 1/1995 | Black et al. |
| 5,386,308 A | 1/1995 | Michel et al. |
| 5,424,927 A | 6/1995 | Schaller et al. |
| 5,440,357 A | 8/1995 | Quaglia |
| 5,443,506 A | 8/1995 | Garabet |
| 5,451,766 A | 9/1995 | Van Berkel |
| 5,488,439 A | 1/1996 | Weltmann |
| 5,512,371 A | 4/1996 | Gupta et al. |
| 5,522,323 A | 6/1996 | Grupp |
| 5,552,841 A | 9/1996 | Gallorini et al. |
| 5,608,567 A | 3/1997 | Grupp |
| 5,615,588 A | 4/1997 | Gottschald |
| 5,654,786 A | 8/1997 | Bylander |
| 5,668,620 A | 9/1997 | Kurtin et al. |
| 5,682,223 A | 10/1997 | Menezes et al. |
| 5,683,457 A | 11/1997 | Gupta et al. |
| RE35,691 E | 12/1997 | Theirl et al. |
| 5,702,819 A | 12/1997 | Gupta et al. |
| 5,712,721 A | 1/1998 | Large |
| 5,728,155 A | 3/1998 | Anello et al. |
| 5,739,959 A | 4/1998 | Quaglia |
| 5,777,719 A | 7/1998 | Williams et al. |
| 5,815,233 A | 9/1998 | Morokawa et al. |
| 5,815,239 A | 9/1998 | Chapman et al. |
| 5,859,685 A | 1/1999 | Gupta et al. |
| 5,861,934 A | 1/1999 | Blum et al. |
| 5,861,936 A | 1/1999 | Sorensen |
| 5,877,876 A | 3/1999 | Birdwell |
| 5,900,720 A | 5/1999 | Kallman et al. |
| 5,949,521 A | 9/1999 | Williams et al. |
| 5,953,098 A | 9/1999 | Lieberman et al. |
| 5,956,183 A | 9/1999 | Epstein et al. |
| 5,963,300 A | 10/1999 | Horwitz |
| 5,971,540 A | 10/1999 | Ofner |
| 5,980,037 A | 11/1999 | Conway |
| 5,999,328 A | 12/1999 | Kurtin et al. |
| 6,040,947 A | 3/2000 | Kurtin et al. |
| 6,050,687 A | 4/2000 | Bille et al. |
| 6,069,742 A | 5/2000 | Silver |
| 6,086,203 A | 7/2000 | Blum et al. |
| 6,086,204 A | 7/2000 | Magnante |
| 6,095,651 A | 8/2000 | Williams et al. |
| 6,099,117 A | 8/2000 | Gregory |
| 6,115,177 A | 9/2000 | Vossler |
| 6,139,148 A | 10/2000 | Menezes |
| 6,145,987 A | 11/2000 | Baude et al. |
| 6,188,525 B1 | 2/2001 | Silver |
| 6,191,881 B1 | 2/2001 | Tajima |
| 6,199,984 B1 | 3/2001 | Menezes |
| 6,213,602 B1 | 4/2001 | Smarto |
| 6,270,220 B1 | 8/2001 | Keren |
| 6,271,915 B1 | 8/2001 | Frey et al. |
| 6,305,802 B1 | 10/2001 | Roffman et al. |
| 6,325,508 B1 | 12/2001 | Decreton et al. |
| 6,350,031 B1 | 2/2002 | Lashkari et al. |
| 6,390,623 B1 | 5/2002 | Kokonaski et al. |
| 6,396,622 B1 | 5/2002 | Alden |
| 6,437,762 B1 | 8/2002 | Birdwell |
| 6,437,925 B1 | 8/2002 | Nishioka |
| 6,464,363 B1 | 10/2002 | Nishioka et al. |
| 6,491,394 B1 | 12/2002 | Blum et al. |
| 6,501,443 B1 | 12/2002 | McMahon |
| 6,554,425 B1 | 4/2003 | Roffman et al. |
| 6,577,434 B2 * | 6/2003 | Hamada .............. 359/319 |
| 6,609,794 B2 | 8/2003 | Levine |
| 6,614,408 B1 | 9/2003 | Mann |
| 6,616,275 B1 | 9/2003 | Dick et al. |

| | | |
|---|---|---|
| 6,616,279 B1 | 9/2003 | Davis et al. |
| 6,618,208 B1 | 9/2003 | Silver |
| 6,626,532 B1 | 9/2003 | Nishioka et al. |
| 6,631,001 B2 | 10/2003 | Kuiseko |
| 6,652,096 B1 | 11/2003 | Morris et al. |
| 6,682,195 B2 | 1/2004 | Dreher |
| 6,709,105 B2 | 3/2004 | Menezes |
| 6,709,107 B2 | 3/2004 | Jiang et al. |
| 6,709,108 B2 | 3/2004 | Levine et al. |
| 6,738,199 B2 | 5/2004 | Nishioka |
| 6,768,536 B2 | 7/2004 | Okuwaki et al. |
| 6,774,871 B2 | 8/2004 | Birdwell |
| 6,778,246 B2 | 8/2004 | Sun et al. |
| 6,793,340 B1 | 9/2004 | Morris et al. |
| 6,833,938 B2 | 12/2004 | Nishioka |
| 6,840,619 B2 | 1/2005 | Dreher |
| 6,851,805 B2 | 2/2005 | Blum et al. |
| 6,859,333 B1 | 2/2005 | Ren et al. |
| 6,882,482 B2 * | 4/2005 | Ogasawara ............... 359/665 |
| 6,883,916 B2 | 4/2005 | Menezes |
| 6,886,938 B2 | 5/2005 | Menezes |
| 6,893,124 B1 | 5/2005 | Kurtin |
| 6,902,271 B2 | 6/2005 | Perrott et al. |
| 6,918,670 B2 | 7/2005 | Blum et al. |
| 6,948,818 B2 | 9/2005 | Williams et al. |
| 6,951,391 B2 | 10/2005 | Morris et al. |
| 6,955,433 B1 | 10/2005 | Wooley et al. |
| 6,956,682 B2 | 10/2005 | Wooley |
| 6,986,579 B2 | 1/2006 | Blum et al. |
| 7,008,054 B1 | 3/2006 | Kurtin et al. |
| 7,009,757 B2 | 3/2006 | Nishioka et al. |
| 7,019,890 B2 | 3/2006 | Meredith et al. |
| 7,041,133 B1 | 5/2006 | Azar |
| 7,085,065 B2 | 8/2006 | Silver |
| 7,133,172 B2 | 11/2006 | Nishioka |
| 7,159,981 B2 | 1/2007 | Kato |
| 7,159,983 B2 | 1/2007 | Menezes et al. |
| 7,209,097 B2 | 4/2007 | Suyama |
| 7,229,173 B2 | 6/2007 | Menezes et al. |
| 7,393,472 B2 * | 7/2008 | Lee et al. .................. 252/500 |
| 2001/0055094 A1 | 12/2001 | Zhang |
| 2002/0140899 A1 | 10/2002 | Blum et al. |
| 2002/0149739 A1 | 10/2002 | Perrott et al. |
| 2002/0186346 A1 | 12/2002 | Stantz et al. |
| 2003/0018383 A1 | 1/2003 | Azar |
| 2003/0151721 A1 | 8/2003 | Lai et al. |
| 2003/0210377 A1 | 11/2003 | Blum et al. |
| 2004/0008319 A1 | 1/2004 | Lai et al. |
| 2004/0108971 A1 | 6/2004 | Waldern et al. |
| 2004/0117011 A1 | 6/2004 | Aharoni et al. |
| 2004/0130677 A1 | 7/2004 | Liang et al. |
| 2004/0179280 A1 | 9/2004 | Nishioka |
| 2004/0196435 A1 | 10/2004 | Dick et al. |
| 2004/0223113 A1 * | 11/2004 | Blum et al. .................. 349/200 |
| 2004/0246440 A1 | 12/2004 | Andino et al. |
| 2005/0036109 A1 * | 2/2005 | Blum et al. .................. 351/168 |
| 2005/0073739 A1 | 4/2005 | Meredith |
| 2005/0124983 A1 | 6/2005 | Frey et al. |
| 2006/0044510 A1 | 3/2006 | Williams et al. |
| 2006/0164593 A1 | 7/2006 | Peyghambarian |
| 2008/0212007 A1 | 9/2008 | Meredith |

FOREIGN PATENT DOCUMENTS

| | | |
|---|---|---|
| DE | 4223395 | 1/1994 |
| EP | 0154962 A2 | 9/1985 |
| EP | 0233104 A1 | 8/1987 |
| EP | 0237365 A1 | 9/1987 |
| EP | 0578833 | 1/1994 |
| EP | 0649044 | 4/1995 |
| GB | 2170613 A | 8/1986 |
| GB | 2169417 A | 7/1987 |
| JP | 55-076323 | 6/1980 |
| JP | 61 156227 | 7/1985 |
| JP | 1237610 | 9/1989 |
| JP | 05-100201 | 4/1993 |
| JP | 7-28002 | 1/1995 |
| JP | 11352445 | 12/1998 |
| JP | 2007-323062 | 12/2007 |
| WO | WO-92/01417 | 2/1992 |
| WO | WO93/21010 | 10/1993 |
| WO | WO-98/27863 | 7/1998 |
| WO | WO-99/27334 | 6/1999 |
| WO | WO-03/050472 A1 | 6/2003 |
| WO | WO-03/068059 A2 | 8/2003 |
| WO | WO-2004/008189 A1 | 1/2004 |
| WO | WO-2004/015481 A1 | 2/2004 |
| WO | WO-2004/034095 A2 | 4/2004 |
| WO | WO-2004/072687 A2 | 8/2004 |
| WO | WO 2007007220 A1 * | 1/2007 |

OTHER PUBLICATIONS

Radhakrishna, M. C., and M. Ramakrishna Rao. "Some Properties of Indium-Tin Oxide Films." Pramana 9.1 (1977): pp. 1-6. Print.*

Jackson, John David. Classical Electrodynamics. New York: Wiley, 1999. pp. 117-119, 125-127, 129-134, 139, 141. Print.*

Ulaby, Fawwaz T. Fundamentals of Applied Electromagnetics. Upper Saddle River, NJ: Prentice Hall, 2001. pp. 157-159, 171, 282, 413. Print.*

A.F. Naumov et al., "Control optimization of spherical modal liquid crystal lenses"; Optics Express, vol. 4, No. 9, pp. 344-352, Apr. 26, 1999.

M. Yu. Loktev et al., "Wave front control systems based on modal liquid crystal lenses"; Review of Scientific Instruments, vol. 71, No. 9, pp. 3290-3297, Sep. 2000.

S. P. Kotova et al., "Modal Liquid Crystal Wavefront Corrector"; Optics Express, vol. 10, No. 22, pp. 1258-1272, Nov. 4, 2002.

Hope, G. M. et al., "Night myopia." Surv. Ophthalmology 29: 129-136 (1984).

Owens, D. A. et al., "Night myopia: cause and a possible basis or amelioration." Am. J. Optometric Physiol. Opt. 53: 709-717 (1976).

Richards, O. W., "Night myopia at night automobile luminances: Final report." Am. J. Optometric Physiology Opt. 55: 469-470 (1978).

Kowel, Stephen T., et. al; Focusing by electrical modulation of refraction in a liquid crystal cell; Applied Optics; Jan. 15, 1984; vol. 23, No. 2.

Thibos, Larry N., et. al.; Vision through a liquid-crystal spatial light modulator; Adaptive Optics Conference; 1999; Durham, UK.

Thibos, Larry N., et. al.; Use of Liquid-Crystal Adaptive-Optics to Alter the Refractive State of the Eye; Optometry and Vision Science; Jul. 1997; vol. 74, No. 7; American Academy of Optometry.

Thibos, Larry N., et. al.; Electronic Spectacles for the 21st Century, Indian Journal of Optometry, Spring 1999; vol. 2, No. 1.

Bradley, Arthur; Profile: Larry N. Thibos, PhD., and Donald T. Miller, PhD.; Indiana Journal of Optometry; Spring 1999; vol. 2, No. 1.

Naumov, A.F.; Liquid Crystal Adaptive Lenses with Modal Control; Optics Letters, Jul. 1, 1998, vol. 23, No. 13; Optical Society of America.

Liquid Lenses Eye Commercial Breakthrough; Opto & Laser Europe, Nov. 2003.

Anderson, M.; Adaptive Optics: Liquid Crystals Lower the Cost of Adaptive Optics; Laser Focus World, Dec. 1999.

Davis, Robert A.; Computer Vision Syndrome—The Eyestrain Epidemic ; Review of Optometry , Sep. 15, 1997.

Lazarus, Stuart M.; The Use of Yoked Base-Up and Base-In Prism for Reducing Eye Strain at the Computer; Journal of the American Optometric Association, Apr. 1996.

Eyecare Business, Oct. 1997.

Miller, Donald T., et. al.; Requirements for Segmented Spatial Light Modulators for Diffraction Limited Imaging Through Aberrated Eyes, Adaptive Optics Conference on Jul. 12-16, 1999.

* cited by examiner

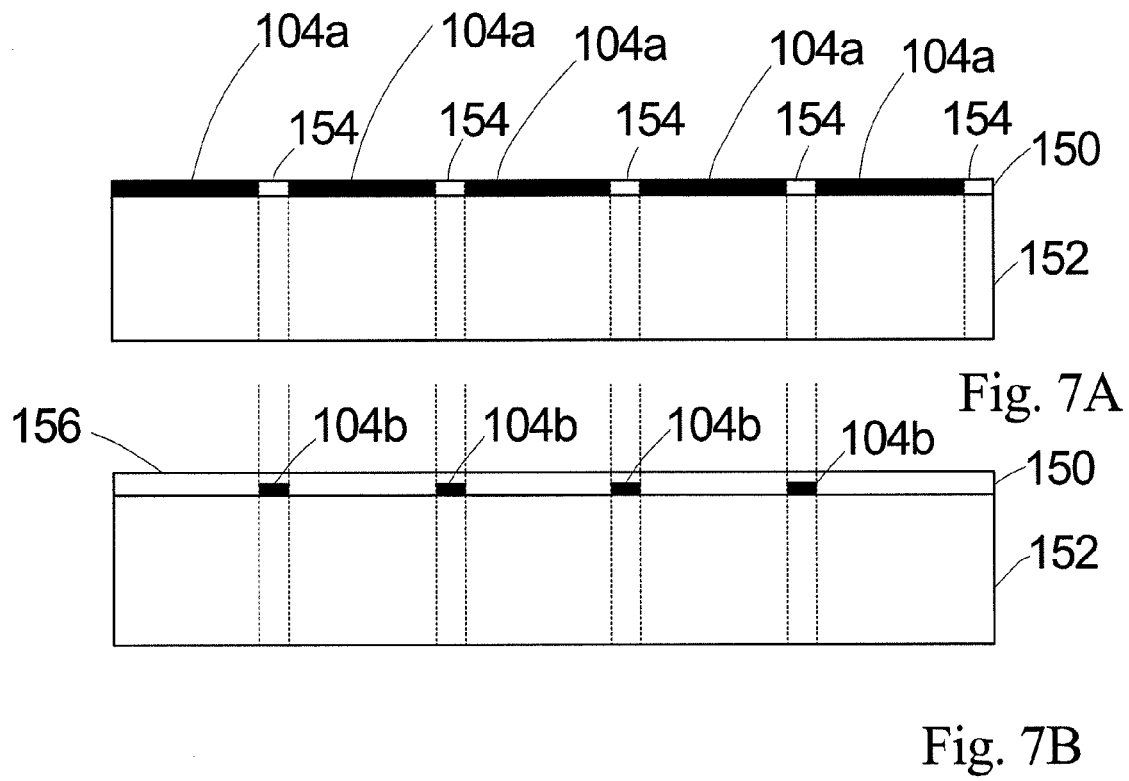
Fig. 7A
Fig. 7B
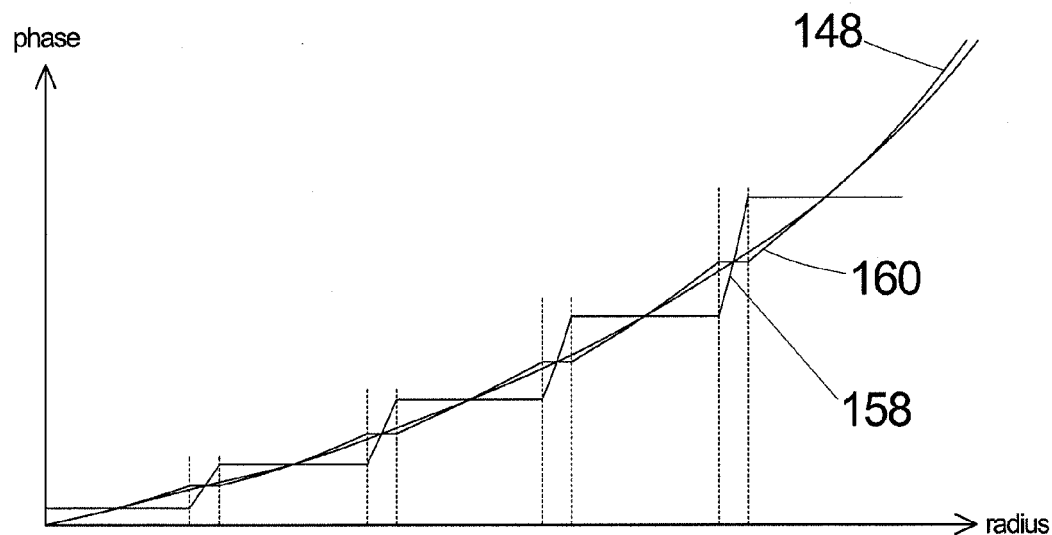
Fig. 7C

ELECTRO-OPTIC LENSES FOR CORRECTION OF HIGHER ORDER ABERRATIONS

CROSS REFERENCE TO RELATED APPLICATIONS

This application is a continuation-in-part of U.S. Ser. No. 12/135,587 filed on Jun. 9, 2008 now abandoned and entitled "Adjustable Correction for a Variety of Ambient Lighting Conditions".

This application claims priority from and incorporates by reference in its entirety U.S. Ser. No. 61/039,181 filed on Mar. 25, 2008 and entitled "Electro-Optic Lenses for Correction of Higher Order Aberrations."

GOVERNMENT INTEREST STATEMENT

This invention was made in whole or in part with government support under Contract Number FA7014-07-C-0013, awarded by the U.S. Air Force, Office of the Surgeon General (AF/SG). The government may have certain rights in the invention.

BACKGROUND OF THE INVENTION

A perfect lens focuses light to a single point on an optical axis of the lens. An aberration of the lens of an eye is a deviation from the perfect focusing of light due to a distortion of a wavefront of light as it passes through the eye having irregularities. The distortion of a wavefront of light may be referred to as an aberrated wavefront. Conventional aberrations of the eye consist of spherical de-focus and regular astigmatism (cylinder), which are correctable by conventional ophthalmic lenses. An eye may also have higher order aberrations, such as, spherical aberration, trefoil, irregular astigmatism, and coma. Each higher order aberration may be represented mathematically by a basis set of polynomials of degree three or more. For example, the aberrations of trefoil and coma are typically represented by third-order polynomials, while the aberration of spherical aberration is typically represented by fourth-order polynomials with respect to radius. With respect to azimuth angle, $\theta$, the aberration wavefront of spherical aberration is represented by a zero-order polynomial, which is constant for all azimuth angles at each radius. That is, the aberration wavefront of spherical aberration is rotationally symmetric, which makes this particular higher order aberration of special interest for further discussion here.

The aberration wavefronts of spherical aberrations of the eye are commonly described mathematically using a series of Zernike polynomials. The Zernike term, $Z_{\circ 4}$, for spherical aberration of the eye is typically of the form:

$$Z_{\circ 4} = ar^4 - br^2 \quad (1)$$

where r is the normalized radial position within the pupil measured from the optical axis of the eye and a and b are constants. An alternate mathematical representation of spherical aberration, referred to as the 'Seidel representation', is of the form, $ar^4$. The Zernike term, $ar^4$, is referred to as the spherical aberration term and the Zernike term, $br^2$, is referred to as the quadratic spherical de-focusing term. Other mathematical representations of spherical aberration of the eye are known, depending on the basis set chosen.

FIG. 1 is a graph of equation (1) showing a spherical aberration wavefront using the Zernike basis set representation. Spherical aberration of the eye can be positive or negative, or zero for example at zero radius.

A variety of approaches are typically used to correct spherical aberration of the eye. One approach exploits the aforementioned rotational symmetry of spherical aberration. In this approach, a lens for correcting spherical aberration is also rotationally symmetric. Such a lens may have a radially symmetric optical power or optical phase variation that is equal and opposite (or nearly so) to that of the aberrated eye. The lens effectively cancels the spherical aberration of the eye. The spherical aberration correction of a lens can be positive (for canceling a negative spherical aberration of the eye) or negative (for canceling a positive spherical aberration of the eye). Although a lens for correcting a fixed amount of spherical aberration is known, other problems arise.

It is shown in equation (1) and FIG. 1 that the amount of distortion (de-focus) of an image due to spherical aberration of an eye depends on the radius of its pupil. Thus, as the pupil changes in size (e.g., in response to a change in ambient light), the amount of spherical aberration affecting de-focus in the eye changes accordingly. This relationship is shown in FIGS. 2-5, which show side views of the focusing of light by a lens 95 of an eye having differently sized openings or pupils.

FIG. 2 shows the lens 95 having a pupil dilated to its maximum diameter (i.e., there is no pupil present to obstruct light). The lens focuses light rays 50, 60, and 70, to multiple points 55, 65, and 75, respectively, on an optic axis of the lens. These multiple focal points are the result of spherical aberration of the natural lens of the eye. It is to be understood that FIGS. 2-5 show the focal points of a few discrete rays and that in an actual optical system there is a continuum of focal points between the focal point 55 and the focal point 75, inclusive of the focal point 65.

FIGS. 3-5 show the lens 95 having pupils 90, 85, and 80, respectively, with respectively decreasing diameter. FIGS. 3-5 show that as the pupil diameter decreases, the multiplicity of focus points (i.e., the degree and effects of spherical aberration) decreases as well. The lens of FIG. 3, having the pupil 90 with the relatively largest diameter, focuses the light rays 50, 60, and 70, to the largest number of distinct points 55, 65, and 75, respectively, on the optic axis of the lens. The lens of FIG. 4, having the pupil 85 with the relatively mid-range diameter, focuses the light rays to a relatively mid-range number of points 55 and 65 (between the numbers in FIGS. 3 and 5) on an optic axis of the eye lens. The lens of FIG. 5, having the pupil 80 with the relatively smallest diameter, focuses the light rays to the smallest number (one) point 55 on an optic axis of the eye lens.

It may be observed that as the diameter of the pupil changes, e.g., with changing ambient light, the amount of the spherical aberration of the natural lens of the eye that is revealed is likewise changed. The amount of spherical aberration that is revealed in the eye typically affects the optical quality of the eye. It is also known that as the diameter of the pupil changes, other higher order aberrations of the eye, such as trefoil may affect image quality as well. While a conventional lens may correct for a fixed amount of spherical aberration and/or other higher order aberrations, a fixed lens cannot provide the necessary correction for changing aberrations in the eye.

There is therefore a great need in the art for providing a lens for providing correction for higher order aberrations in the eye, such as spherical aberration, trefoil, irregular astigmatism, and coma, that change the phase correction profile in response to a change in ambient light or pupil diameter. Accordingly, there is now provided with this invention an improved lens for effectively overcoming the aforementioned difficulties and longstanding problems inherent in the art.

SUMMARY OF THE INVENTION

In an embodiment of the invention, a lens may include a substrate and an electrode layer. The electrode layer is positioned upon the substrate. The electrode layer has radially alternating rings of electrodes and resistive material. When voltage is applied across two adjacent electrodes the profile of the electric field therebetween is linear. When voltage is applied to the rings of electrodes, the optical phase profile of the lens closely approximates the optical phase of ideal spherical aberration correction.

In an embodiment of the invention, a lens for correcting spherical aberration may include a plurality of concentric electrode rings, wherein when voltage is applied to the electrode rings the optical phase profile between adjacent electrode rings closely approximates the optical phase profile of ideal spherical aberration correction.

In an embodiment of the invention, a lens may include a uniform electrode layer and a patterned electrode layer spaced from the uniform electrode layer. The patterned electrode layer may have concentric rings of electrodes and may be coated with a resistive material. Adjacent electrode rings are spaced by a distance that is substantially greater than the distance of the space between the electrode layers. When voltage is applied across the electrode layers the optical phase profile of the lens approximates the optical phase profile of ideal spherical aberration correction.

In an embodiment of the invention, a lens system may include a lens having an electro-active element, a sensor for sensing pupil size, a controller in operative communication with the sensor, and a plurality of pixelated electrodes electrically connected to the controller. The controller applies a first set of voltages to the plurality of pixelated electrodes corresponding to a first sensed pupil size and a second set of voltages to the plurality of pixelated electrodes corresponding to a second sensed pupil size. The application of voltage causes a change in the refractive index of the lens for correcting a higher order aberration of the eye corresponding to the sensed pupil size.

In an embodiment of the invention, a lens system may include a lens having an electro-active element, a sensor for sensing an amount of ambient light, a controller in operative communication with the sensor, and a plurality of pixelated electrodes electrically connected to the controller. The controller applies a first set of voltages to the plurality of pixelated electrodes corresponding to a first sensed amount of ambient light and a second set of voltages to the plurality of pixelated electrodes corresponding to a second sensed amount of ambient light. The application of voltage causes a change in the refractive index of the lens for correcting a higher order aberration of the eye corresponding to the sensed amount of ambient light.

BRIEF DESCRIPTION OF THE DRAWINGS

Specific embodiments of the present invention will be described with reference to the following drawings, wherein:

FIGS. 7A and 7B show cross-sectional views of a portion of the lens of FIG. 6A having the patterned electrode layers of FIGS. 6B and 6E, respectively, in accordance with two different embodiments of the invention for correcting spherical aberration of an eye.

FIG. 7C shows optical phase profiles of an ideal spherical aberration correction and the corrections provided by the lens portions of FIGS. 7A and 7B.

DESCRIPTION OF THE PREFERRED EMBODIMENT

The size of the pupil aperture that allows light to enter the eye affects the level of image distortion of an eye. The lenses described herein attempt to correct this aberration. Therefore, these lenses are dynamically changeable in response to the size of the pupil of the eye.

Figure 6A:
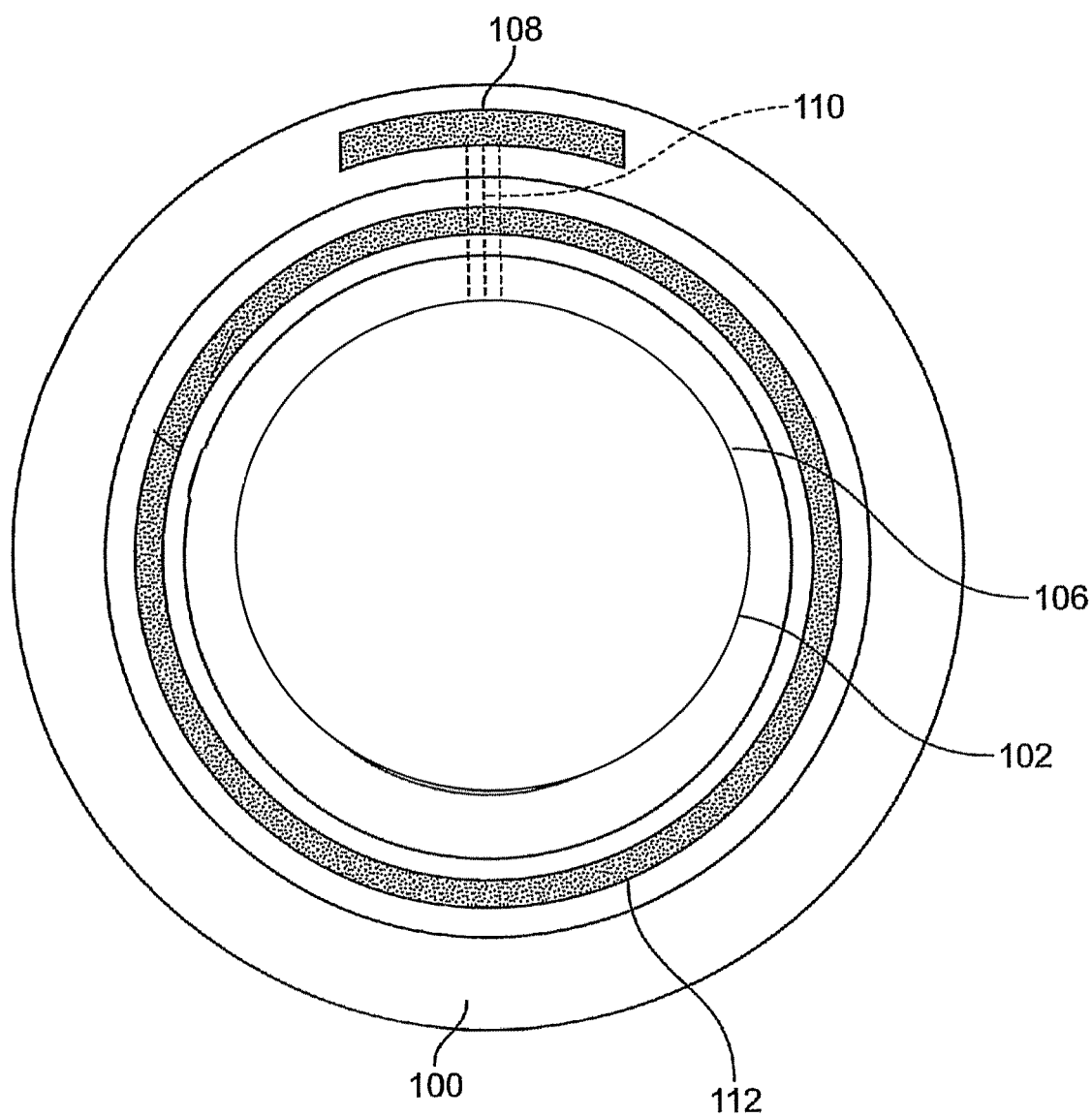
FIG. 6A shows a front view of a lens 100 of the present invention having an electro-active region 102 for correcting changing higher order aberration of an eye.

FIG. 6A shows a front view of a lens 100 having a sensor 106, a controller 108, and an electro-active region 102 for correcting changing higher order aberrations of an eye.

A lens system can include all of the components discussed herein, which can all be incorporated in a single lens, or alternatively, some of the components can be apart from the lens e.g., in a spectacle frame, a handheld device, or the user's apparel.

In one approach the sensor 106 senses a change in pupil size. In one approach, the sensor includes an imager in operative communication with a storage device and a processor. The imager is adapted for capturing images of the pupil over time. The images are typically stored in the storage device, although alternatively they may be sent directly as signals to the processor. The processor retrieves the images and compares contrast levels therebetween for identifying the dilation or constriction of the pupil over time. In another approach, the sensor includes a transmitter, a receiver, and a processor, all of which are operatively connected. The transmitter and the receiver are located internal or external to the eye. The transmitter transmits signals over time. The receiver receives the signals that reflect off of the iris of the eye (defining a moveable boundary of the pupil). The processor retrieves data associated with the reflected signals and calculates the trajectories of the reflected signal over time. The processor uses these trajectories to identify a change in the location of the iris over time. Accordingly, the processor identifies a dilation or constriction of the pupil over time. The sensor can transmit a report of this identification, e.g., via an input in the lens or in a spectacle frame that is not shown.

In various examples, the sensor 106 measures radius, diameter, circumference, surface area of an eye opening, azimuth angle or radius of an eyelid measured from the optical axis of the lens, direction of the optical axis of the eye, or any combination thereof, to determine the size of the pupil. In some cases, pupil size may be a measure of the overall opening of the lens of the eye to ambient light and includes a measure of squinting and/or blinking of the eye lid.

In another approach the sensor 106 senses a change in ambient light. The sensor can be a photo-detector for detecting ambient light, such as a photovoltaic or photoconductive device. The sensor detects light internal or external to the eye.

In one example, the sensor 106 determines an exact value of the pupil size and/or ambient light. In another example, the sensor 106 determines a relative value, for example, a degree or rate of change of the pupil size and/or ambient light.

Alternatively or in addition to the aforementioned designs, the sensor 106 may include a physical, manual, or capacitive switch (e.g., which switches between 'on' and 'off' when a user touches the nose bridge).

The controller 108 is in operative communication with the sensor 106. When the sensor senses a change, an action is triggered in the controller. The sensor and controller typically communicate via a direct electrical connection (e.g. wire(s)) or a transmit/receive device, such as an antenna or a micro-electro-mechanical systems (MEMS) switch.

The electro-active region 102 includes, for example, two electrode layers that are spaced from each other with an electro-active material therebetween. The controller 108 is electrically connected to the two electrode layers. The controller may include drive electronics 110 and a power supply 112 such as a rechargeable battery. The controller applies voltage to each of the two electrode layers sufficient for forming an electric field thereacross and insufficient for the electrode layers to conduct with each other (i.e. short-circuiting). The controller preferably applies an alternating current (AC) to the electrode layers, but alternatively, may apply a direct current (DC).

In an embodiment of the invention not shown in the figures, a first of the two electrode layers is positioned on a first inner surface on a substrate layer of the lens. The second of the two electrode layers is typically formed on a second inner surface on a substrate layer of the lens positioned above or below the first electrode layer. The first electrode layer is typically a patterned electrode layer. The second electrode layer is typically a uniform conductive layer (e.g., not etched), which serves as a ground electrode. There is a gap between the first and second electrode layers. The gap contains an electro-active material. The electro-active material includes liquid crystalline materials such as nematic liquid crystal or, alternatively cholesteric liquid crystal. The electro-active material is preferably birefringent with the ability to alter refractive index by the application of an electric field. When the controller applies a voltages potential to the first and second electrode layers, an electric field is generated thereacross. This electrical field causes a change in the refractive index of the electro-active material, corresponding to an optical power or optical phase profile that is equal and opposite to that of an aberration wavefront of an eye. The lens effectively cancels aberrations of the eye.

The patterned electrode layer includes a plurality of patterned electrodes. Patterned electrodes are disconnected from each other and individually electrically connected to the controller. When the controller applies a series of voltages to the patterned electrodes a non-constant electric field pattern is generated across the lens. The electric field pattern causes a corresponding refractive index pattern across the lens, generating a corresponding optical phase profile.

Patterned electrodes may be shaped and arranged to generate an optical phase profile equal and opposite to that caused by the aberration wavefront of the eye. In one embodiment, shown in FIGS. 6B and 6E, the patterned electrodes are shaped as concentric electrode rings for cancelling the concentric (i.e., rotationally symmetric) spherical aberration of the eye. In another embodiment, shown in FIG. 8A, the patterned electrodes are shaped as "pixels" or a discrete array of spot electrodes for canceling more complex radially asymmetric higher order aberration such as trefoil and coma.

Figure 6B:
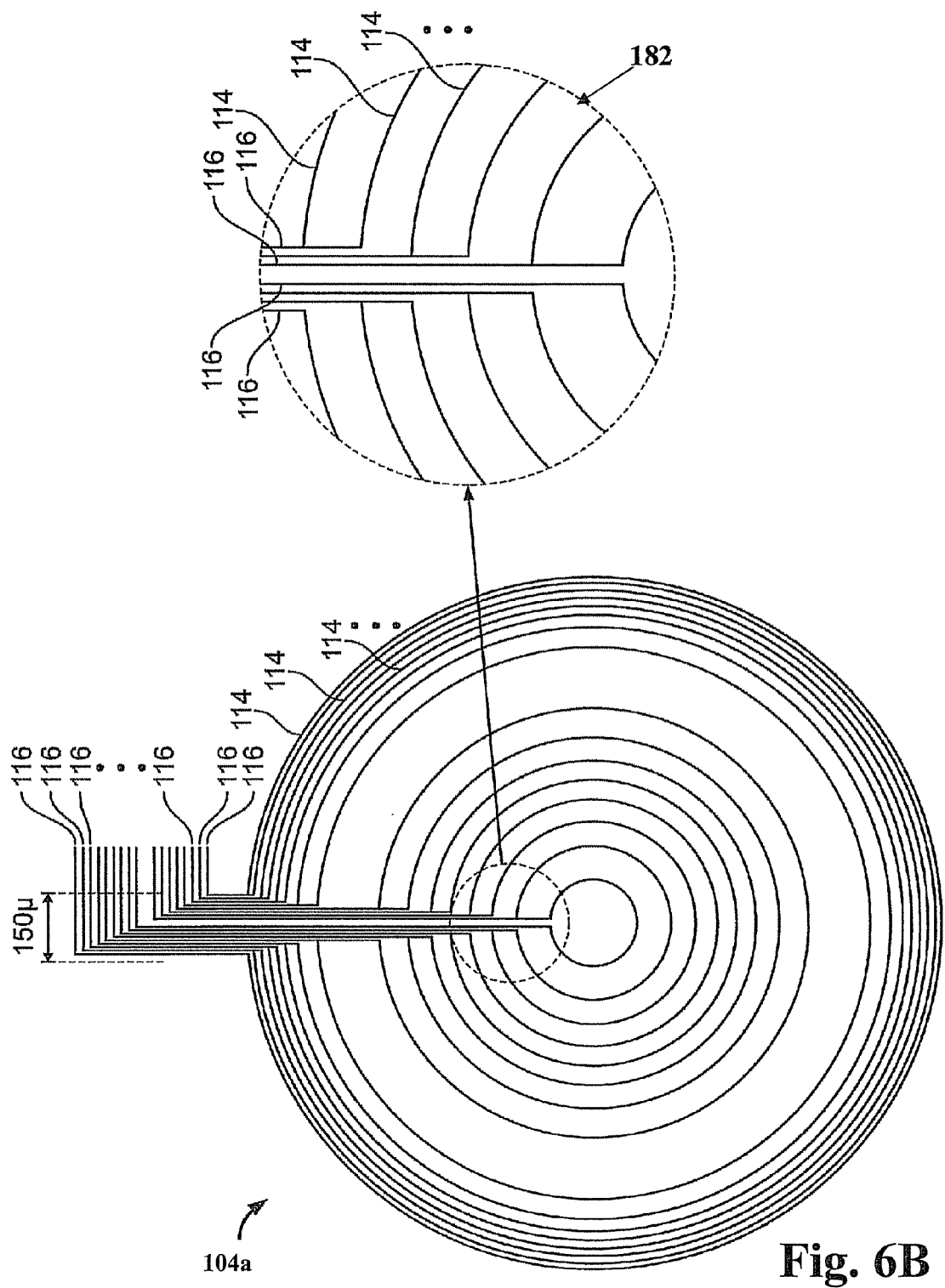
FIG. 6B shows a front view of a patterned electrode layer for use in the lens of FIG. 6A for correcting spherical aberration of an eye according to a first embodiment of the invention.

FIG. 6B shows a front view of a patterned electrode layer for use in the lens of FIG. 6A for correcting spherical aberration of an eye according to a first embodiment of the invention. The patterned electrode layer has a plurality of concentric electrode rings 104a. The plurality of electrode rings 104a are, e.g., concentric with the geometric center of the lens. The electrode rings cover a surface of the lens extending radially from the center of the lens to a radius of between approximately 10 mm and approximately 20 mm, although larger radii are possible. The electrode rings are, e.g., circular, although other geometries such as elliptical or polygonal geometries may alternatively be used. Although 16 electrode rings are shown, any number of rings may be used. The number of electrode rings is typically between 2 and 100, and preferably between 10 and 20. The electrode rings are optically transparent. The electrode rings are composed of any of the known transparent conductive metallics, e.g., indium tin oxide (ITO) or a conductive organic material, e.g., poly(3,4-ethylenedioxythiophene) poly(styrenesulfonate) (PEDOT:PSS) or carbon nano-tubes. Insulating material may be inserted in the spaces between adjacent electrode rings.

FIG. 6B includes a close-up view 182 of the patterned electrode layer. The close-up view shows that each of the electrode rings 104a includes a ring 114 portion interrupted by a pair of extending electrodes 116. Each pair of extending electrodes 116 extends for electrically connecting the rings 114 with a controller and/or drive electronics. The extending electrodes occupy a minimum space of the surface area of the lens for maximizing the surface area of the remaining ring portion of the electrode rings, while having a sufficient amount of space therebetween to prevent the electrode rings from conducting (i.e., short-circuiting). The width across the electrode rings is, e.g., less than 100 microns (μm) and preferably less than 300 μm. The width across the extending electrodes is, e.g., less than 1 millimeter (mm) and preferably less than 150 μm. It may be appreciated that, although the rings of the electrode rings do not form closed loops (i.e., they are interrupted by the extending electrodes), they are still considered rings.

Figure 3:
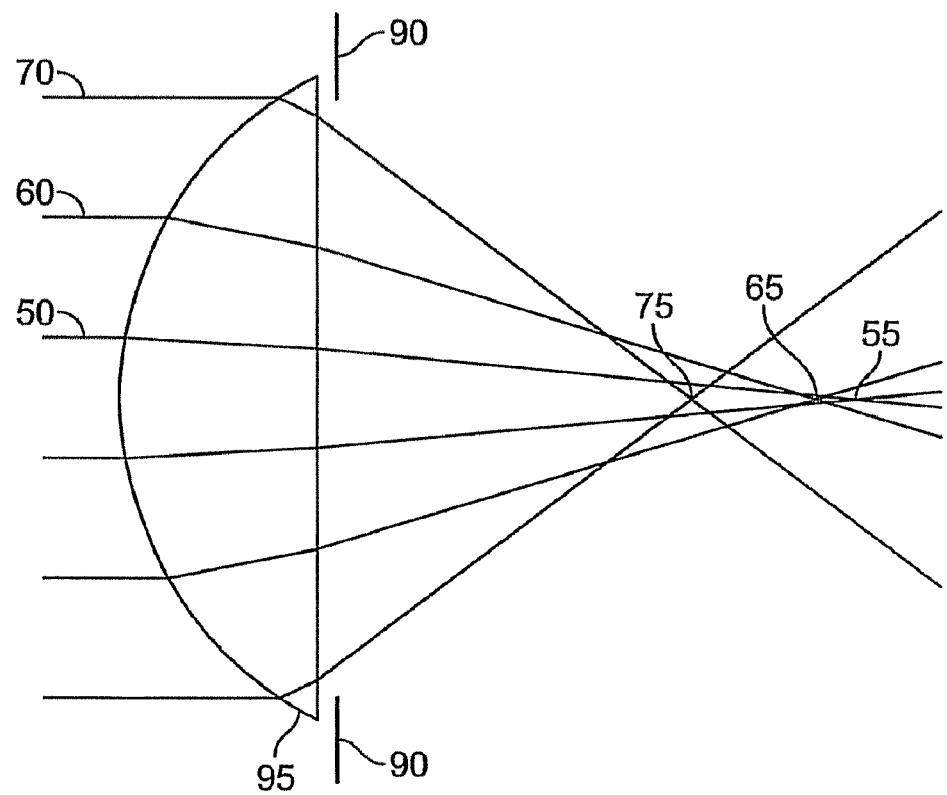
Figure 4:
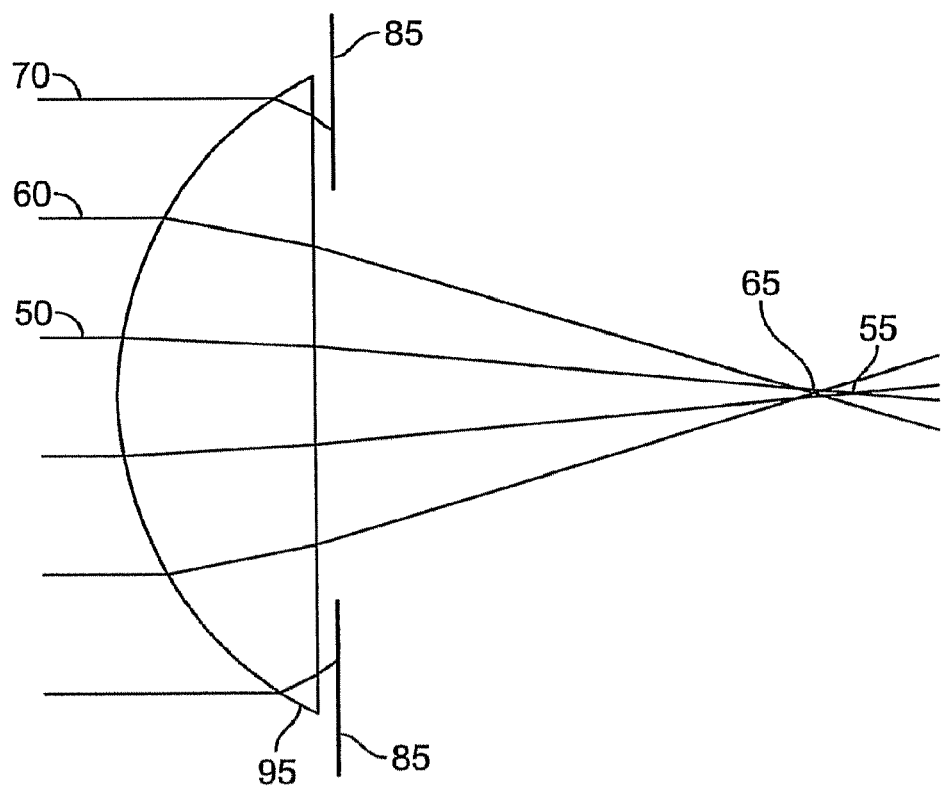
Figure 5:
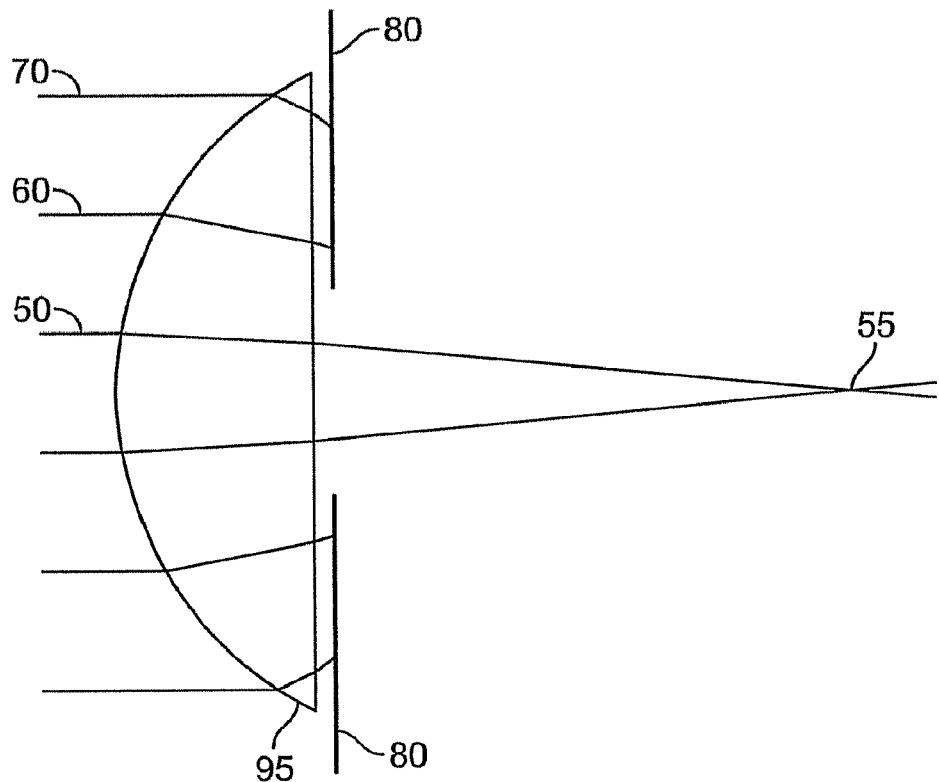
Figure 6C:
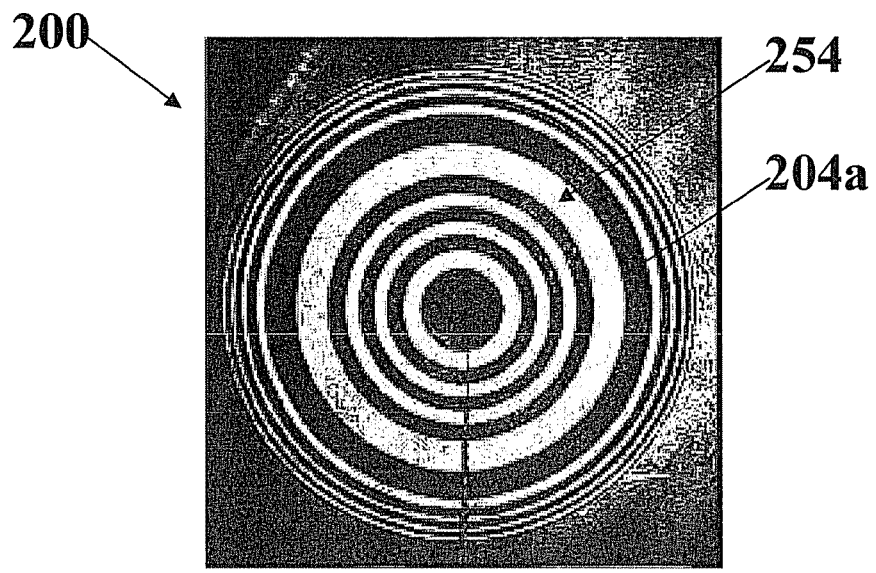
FIGS. 6C and 6D are photographs taken through crossed polarizers of a prototype of the lens of FIG. 6A having the patterned electrode layer described in reference to FIG. 6B, where the photographs show the lens in an 'off' and 'on' mode, respectively.
Figure 6D:
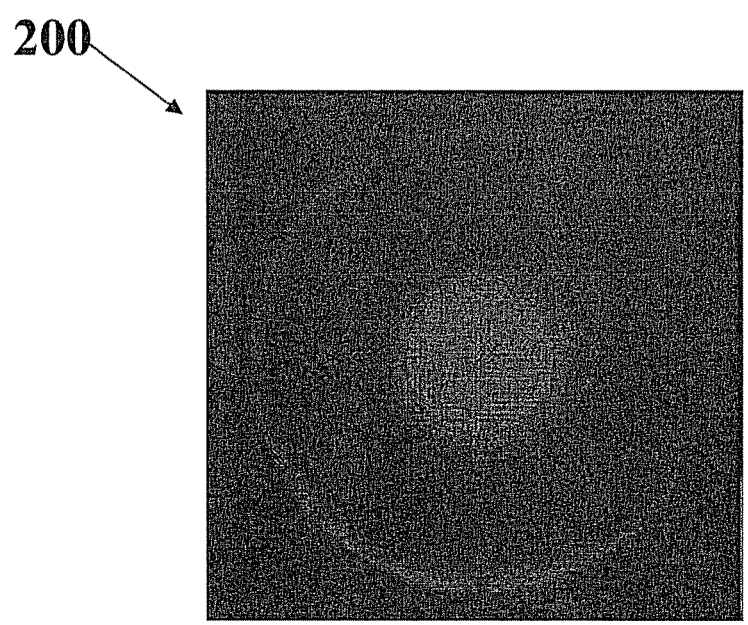

FIGS. 6C and 6D are photographs taken through crossed polarizers of a prototype 200 of the lens of FIG. 6A having the patterned electrode layer described in reference to FIG. 6B. The intensities in the photographs show the optical phase profiles of the lens. In FIGS. 6C and 6D, the lens prototype is powered to provide different spherically symmetric phase profiles. The plurality of concentric circular electrode rings are arranged in the lens to form a voltage pattern which, when voltages are applied to the electrode rings, the voltage pattern causes the optical phase profile of the lens to be equal and opposite to spherical aberration of an eye. The optical phase profile of the lens prototype is constant along the azimuth axis and varies along the radial axis. In FIG. 6C, 3.6 V was applied to each of the plurality of concentric circular electrode rings. In FIG. 6D, voltages ranging from 1V to 4V were applied to the electrode rings, so the resultant phase profile approximated a Zernike $Z^4_0$ polynomial. However, any voltage in a range of from approximately 1 volt to approximately 10 volts may be used. Other voltages may be used depending on the optical effects sought.

Figure 6E:
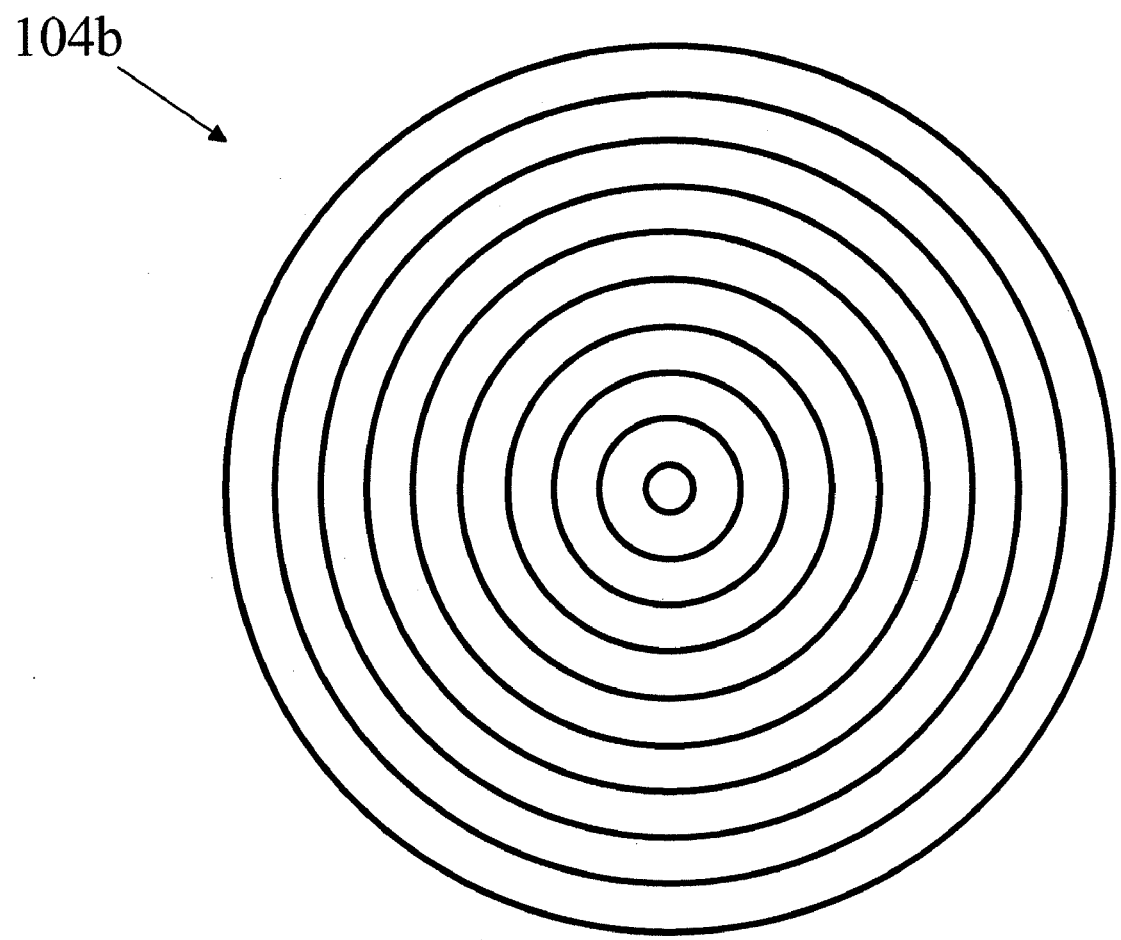
FIG. 6E shows a front view of a patterned electrode layer for use in the lens of FIG. 6A for correcting spherical aberration of an eye according to a second embodiment of the invention.

FIG. 6E shows a front view of a patterned electrode layer for use in the lens of FIG. 6A for correcting spherical aberration of an eye according to a second embodiment of the invention. The patterned electrode layer has a plurality of concentric electrode rings 104b. The electrode rings 104b of FIG. 6E are significantly narrower than the electrode rings 104a of FIG. 6B (e.g., by a factor of 50). For example, the width of each of the electrode rings 104b of FIG. 6E is less than approximately 100 μm, and preferably approximately 10 μm. Additionally, the spaces between adjacent electrode rings 104b of FIG. 6E are significantly wider (e.g., by a factor or 50). These spaces are occupied by a resistive material. The resistive material is more conductive than the insulating material used between the adjacent electrode rings 104a of FIG. 6B. These and other differences between the patterned electrode layers of FIGS. 6B and 6E are described in further detail below in reference to the cross-sectional views thereof shown in FIGS. 7A and 7B.

FIGS. 7A and 7B show cross-sectional views of a portion of the lens of FIG. 6A having the patterned electrode layers of FIGS. 6B and 6E, respectively, in accordance with two different embodiments of the invention for correcting spherical aberration of an eye. The cross-sections of FIGS. 7A and 7B are taken in a plane perpendicular to the surfaces of the layers of the lens of FIG. 6A, from the radial center of the lens to the lens periphery.

In both of the embodiments of FIGS. 7A and 7B, the lens portions include a substrate layer 152 and a patterned electrode layer 150.

The substrate layer 152 is an optically transparent structure forming at least an inner surface of the lens. The substrate layer may or may not have optical properties, e.g., providing additional (plus or minus) fixed optical power to the lens, e.g., by refraction or diffraction. For example, although the outer surfaces of the substrate layer are shown to have a flat topography, alternatively, these surfaces may have a curved or surface relief diffractive topography.

A uniform electrode layer (not shown) is typically formed on a second substrate layer opposite to the substrate layer of the patterned electrode layer. The two electrode layers are separated by a gap occupied by electro-active material. When voltage is applied across the electrode layers, the properties of the electro-active material are altered for altering the optical properties of the lens.

The lens portions of FIGS. 7A and 7B differ by the composition of their patterned electrode layers 150.

In FIG. 7A, the patterned electrode layer 150 includes a radially alternating arrangement of electrode rings 104a and insulating rings 154.

The electrode rings 104a are radially concentric. Thus, when different voltages are applied to the electrode rings, the electrode rings form a voltage pattern that changes symmetrically as a function of the radius of the lens.

The insulating rings 154 have a width and resistance sufficient for preventing the electrode rings from conducting with each other (i.e., short-circuiting). The width of each of the insulating rings is in a range of from approximately 1 μm to approximately 20 μm. The resistance of each of the insulating rings is in a range of from approximately $10^{14}$ Ohms per square to approximately $10^{18}$ Ohms per square. Other dimensions, resistance values, and/or numbers of electrode rings and insulating rings may alternatively be used depending on the optical effects sought to be achieved.

The insulating properties of the insulating rings 154 cause voltages applied to the electrode rings 104a to be significantly confined to the region occupied by the electrode rings. That is, voltage potentials across each of the electrode rings cannot dissipate beyond their boundary with the insulating rings. Accordingly, sharp gradients (i.e., discontinuities) in voltage occur at the boundaries of the electrode rings and the insulating rings. These gradients in voltage form an optical phase profile of the lens correction wavefront that likewise has sharp gradients at these boundaries.

FIG. 7C shows an optical phase profile of a first correction 158 of spherical aberration provided by the lens portion of FIG. 7A together with an optical phase profile of an ideal correction 148 for spherical aberration of an eye. The optical phase profiles shown in FIG. 7C are measured from the center of an ideal or physical lens and along a radial axis thereof.

The optical phase profile of the ideal correction 148 for spherical aberration the eye is a negation of the optical phase profile of the spherical aberration wavefront of the eye. The ideal correction is typically defined as a continuous and non-linear (i.e., curved) function, e.g., a fourth order polynomial such as $-ar^4+br^2$. When applied to an eye having spherical aberration wavefront of, e.g., $+ar^4-br^2$, a lens having the ideal correction should cancel the aberration wavefront to exactly zero.

The optical phase profile of the first correction 158 of the lens portion of FIG. 7A alternates between a constant value in the regions occupied by the electrode rings and a linear function in the regions between adjacent electrodes. Since the electrode rings are conductive (forming a local plateau of voltage potential) and the insulating rings are insulating (having an approximately linear voltage potential), the voltage profile and thus the corresponding optical phase profile across the lens resembles a stair-step function. The stair-step function voltage profile differs from the smooth curved function of the ideal correction 148.

The incline or slope of the stair-step voltage and phase profiles is increased as the distance between adjacent rings is decreased. That is, the smaller the spacing between adjacent electrode rings, the larger the gradient in voltage potential and optical phase there between. Accordingly, increasing the gap between electrode rings decreases the gradient in voltage potential, making the optical phase profile vary in a more gradual manner. The more gradual the incline of the optical phase profile, the more closely the profile will approximate the ideal correction 148.

However, the inherent structure of the lens portion of FIG. 7A prevents the electrode rings from being separated by more than a maximum distance. For example, typically the electrode rings are spaced by a distance that is less than or equal to the distance between the patterned electrode layer and the opposite uniform electrode layer. When the distance between the rings of the patterned electrode layer is increased beyond this distance, the constant voltage profile of the uniform electrode layer will dominate the voltage profile of the patterned electrode layer. When the voltage profile of the uniform electrode layer dominates, the voltage profile of the lens becomes constant and no longer approximates the curved ideal correction 148 for correcting spherical aberration.

To more closely or exactly match the ideal correction 148, an approach described in reference to FIG. 7B may be used.

In FIG. 7B, the patterned electrode layer 150 includes the plurality of electrode rings 104b rings overlaid with a resistive layer 156. The resistive layer is in electrical communication with the electrode rings 104b.

The resistive layer 156 has a resistance that allows a voltage potential generated at the electrode rings 104b to dissipate beyond the electrode rings. That is, the voltage applied to the electrode rings is not confined to the surface of the electrode rings themselves, but is conducted through the resistive layer. The resistive layer 156 of FIG. 7B has a greater resistance (or equivalently, a lesser conductivity) than the electrode rings 104b of FIG. 7B (e.g., by a factor of at least 1000), but a significantly smaller resistance than the insulating rings 154 of FIG. 7A (e.g., by a factor of 1000). The resistance of the resistive layer 156 is in a range of from approximately 0.1 Mega-Ohms per square to approximately 100 Mega-Ohms per square. The resistance of the substrate layer 152 is greater than approximately $10^{18}$ Ohms per meter, and ideally infinite. The resistance of the electrode rings 104b is less than approximately 200 Ohms per square. Other measures of resistance may be used depending on the optical effects sought to be achieved. The resistive layer typically has a high transparency, e.g., preferably greater than 90%, and is environmentally stable. In one example, the resistive layer may be composed of, e.g., a PEDOT material. In this example, the electrode rings may be composed of ITO, which has a lesser resistance than PEDOT materials. Other materials may be used. The thickness of the resistive layer and the electrode layer as a whole is, e.g., less than 200 nanometers (nm), and preferably less than 40 nm.

In a lens, when voltage is applied across the pattern electrode layer and the uniform electrode layer, the resistive layer shields the patterned voltage profile of the patterned electrode layer from the constant voltage profile of the opposite uniform electrode layer. Accordingly, the electrode rings of the patterned electrode layer of the lens portion of FIG. 7B may be separated by a greater distance than in FIG. 7A without experiencing substantially interfering voltage from the uniform electrode layer. For example, adjacent electrode rings 104b in FIG. 7B may be separated by a distance that is greater than the distance between the patterned electrode layer and the uniform electrode layer.

FIG. 7C shows an optical phase profile of a second correction 160 provided by the lens portion of FIG. 7B. Since the space between adjacent electrode rings are increased in FIG. 7B relative to FIG. 7A, the voltage profile and corresponding optical phase profile are more gradually inclined in the space between adjacent electrode rings. Accordingly, in the space between adjacent electrode rings the second correction 160 may approximately match the ideal correction 148. Compared to the first correction 158, which has a greater incline in the space between adjacent electrode rings, the second correction 160 more closely matches the ideal correction 148.

Although the second correction 160 closely matches the ideal correction 148 in the space between adjacent electrode rings, outside these regions, in the space occupied by the electrode rings themselves, the corrections may not match. Across the electrode rings, the voltage and therefore the optical phase profile is substantially constant (i.e., defined by a zero-order polynomial) and therefore different from the ideal correction (e.g., defined by a $4^{th}$ order polynomial). It may be appreciated that the narrower the electrode rings, the smaller the region having a constant optical phase profile. Therefore, the widths of the electrode rings 104b of FIG. 7B are minimized to minimize the corresponding constant optical phase profile of the second correction 160 of FIG. 7C. As described hereinabove, in one example, the width of each of the electrode rings 104b of FIG. 7B is, e.g., less than 10 μm. When the widths of the electrode rings 104b of FIG. 7B are minimized to these exemplified values, the constant portions of the second correction 160 of FIG. 7C are reduced to a negligible amount, for example, less than 10 μm. The difference between the constant portions of the optical phase profile of the second correction 160 and the curved incline of the optical phase profile of the ideal correction 148 is typically invisible to a user when viewed in a lens in an unmagnified state.

Experiments were conducted shining light at a wavelength of approximately 555 nm on an eye with peak photopic (bright light) spectral responsiveness. The experiments show that a lens built according to FIG. 7B may correct spherical aberration with root-mean-square (rms) values of approximately 1 μm. Typically, most eyes have spherical aberration less than or equal to 1 μm rms.

Computer programs are known in the art for calculating voltages and corresponding electric fields across a lens to generate a desired optical phase profile. Such programs include for example "Lorentz" and "2dimMOS". The relationships between voltages, electric fields, and optical phase profile may depend on the material properties of the electro-active material used in the lens, the spacing between the ground electrode layer and the patterned electrode layer in a stacked configuration of a lens and other design features of the lens.

The aforementioned description, describes primarily an electro-active lens designed for correcting spherical aberration. However, an eye may have higher order aberrations other than spherical aberration, e.g., including trefoil and coma. Typically, the eye has an aberrated wavefront that lacks the aforementioned radial symmetry attributed to spherical aberration. Such an eye requires a more general correction than is used for an eye having only spherical aberration. Additional high-order aberrations are commonly found in an eye, but at powers comparable to or less than typical powers of spherical aberration. Experiments have shown that visual acuity may be measurably improved by correcting as many of the high-order aberrations as possible.

Collectively, all higher order aberrations of the eye may form a complex and asymmetric distorted aberration wavefront. To correct this distorted aberration wavefront, a lens is needed having a comparably complex correction pattern in order to cancel any arbitrary aberrated wavefront.

Figure 8A:
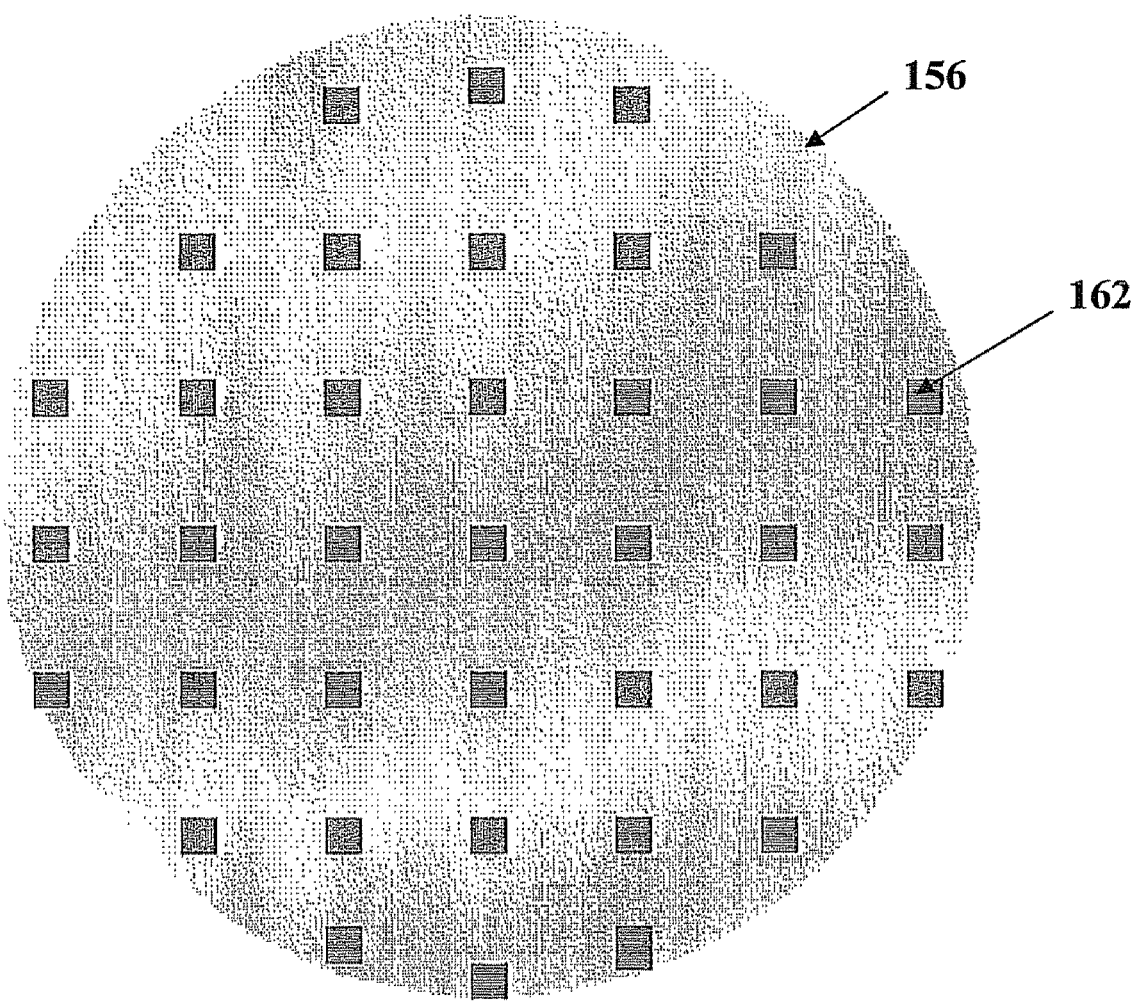
FIG. 8A shows a front view of a patterned electrode layer for use in the lens of FIG. 6A for correcting higher order aberration of an eye according to a third embodiment of the invention.

FIG. 8A shows a front view of a patterned electrode layer for use in the lens of FIG. 6A for correcting all higher order aberration of an eye according to a third embodiment of the invention.

The patterned electrode layer has a plurality of pixelated electrodes 162. Pixelated electrodes may be an array of electrodes localized at different positions on a surface of the lens substrate. In contrast with the electrode rings of FIGS. 6B and 6E, which encircle a lens surface and are concentric with a common point, each of the pixelated electrodes of FIG. 8A has a different center point (e.g., the center of the electrode itself). The pixelated electrodes may be individually addressable electrodes arranged to accommodate a complex voltage pattern to generate an optical phase profile to negate that caused by any or all of the higher order aberrations of the eye. Since the optical phase profile needed for correcting an arbitrary aberrated wavefront is typically asymmetric pixelated electrodes are needed as opposed to symmetric electrode rings. The number of pixelated electrodes across the surface of a lens is in a range of from approximately 10 to approximately 500 and, preferably, in a range of from approximately 20 to approximately 100. Generally, the greater the number of pixelated electrodes, the more closely the corrective conjugate phase profile will resemble the aberrated phase profile. The pixelated electrodes may be squares of dimension, e.g., 10 $\mu m^2$. The distance between adjacent pixelated electrodes may be, e.g., 1 mm. The pixelated electrodes may be shaped as squares, circles, rectangles, or any other regular or irregular shape. In one embodiment, pixelated electrodes may be regularly spaced to form a grid. For example, pixelated electrodes may be shaped as squares and arranged in a Cartesian array (e.g., as shown in FIG. 8A) or hexagons arranged in a hexagonal array (not shown). In another embodiment (not shown), pixelated electrodes may be irregularly spaced. In one approach, pixelated electrodes may be randomly placed. The number of pixelated electrodes may be minimized to reduce the complexity of the electrical buss network that interconnects the pixelated electrodes to the controller.

In an embodiment not shown, each of the pixelated electrodes may be individually connected to a controller, e.g., via an electrical buss (not shown). The electrical busses are preferably transparent. The controller may apply a specific voltage to each pixelated electrode to collectively form a voltage pattern for altering the refractive index of the lens to cancel an individual user's aberrated wavefront. The refractive index of the lens may be changed to correct higher order aberrations due to different amounts of ambient light, pupil size, or other environmental parameter. Multiple voltage arrays may be stored in the controller to generate the appropriate correction profile for each such circumstance. Computer software may be used to convert the aberrated wavefront phase profile, as measured by a wavefront sensor, into the appropriate voltage array necessary for correction. The micro-controller chip may then retrieve the required voltages from its memory and multiplex the voltages to the pixelated electrodes.

In an alternative embodiment, each of the pixelated electrodes may be controlled using a matrix addressing scheme. In a "passive" matrix addressing scheme, each of the pixelated electrodes is addressed by row and column buss lines. Pixelated electrodes are activated with a voltage when the appropriate row and column buss lines corresponding to that individual pixelated electrode are turned on. The controller applies voltage to the pixelated electrode matrix via a conventional progressive or interlaced row-column addressing scheme. This technology is well known in the field of liquid crystal displays. This embodiment may reduce the number of buss lines needed, e.g., compared with the aforementioned embodiment in which each pixelated electrodes is individually connected to the controller.

In yet another embodiment, referred to as "active" matrix addressing, small transistor-based integrated circuits may be grown onto a back surface of the electrode layer for electrically communicating with each pixelated electrode. The controller applied voltages to a central transistorized circuit which modulates voltage individually for each pixelated electrode. Compared to "passive" matrix addressing or individually connected pixelated electrodes, this embodiment more accurately controls the contrast ratios between pixelated electrodes to create a more precise correction to an arbitrary distorted wavefront.

The resistive layer 156 (e.g., described in reference to FIG. 6E) may coat the plurality of pixelated electrodes 162 to occupy the gaps formed therebetween. The resistive layer may shield the patterned electrode layer from the constant voltage profile of the uniform (e.g., ground) electrode layer disposed thereacross in a lens. Accordingly, the pixelated electrodes 162 may be spaced at relatively large distances, e.g., larger than the distance between the patterned electrode layer and the uniform electrode layer. As described above in reference to FIG. 7C, when the distance between adjacent electrodes, e.g., pixelated electrodes 162, is increased, the voltage potential and corresponding optical phase profiles of the lens changes more gradually to more closely approximate ideal aberration correction. In one example, the optical phase profile of the lens may be programmed to approximate an arbitrary aberration, e.g., including one or more higher order aberrations such as spherical aberrations, trefoil, coma, or a combination thereof.

Figure 8B:
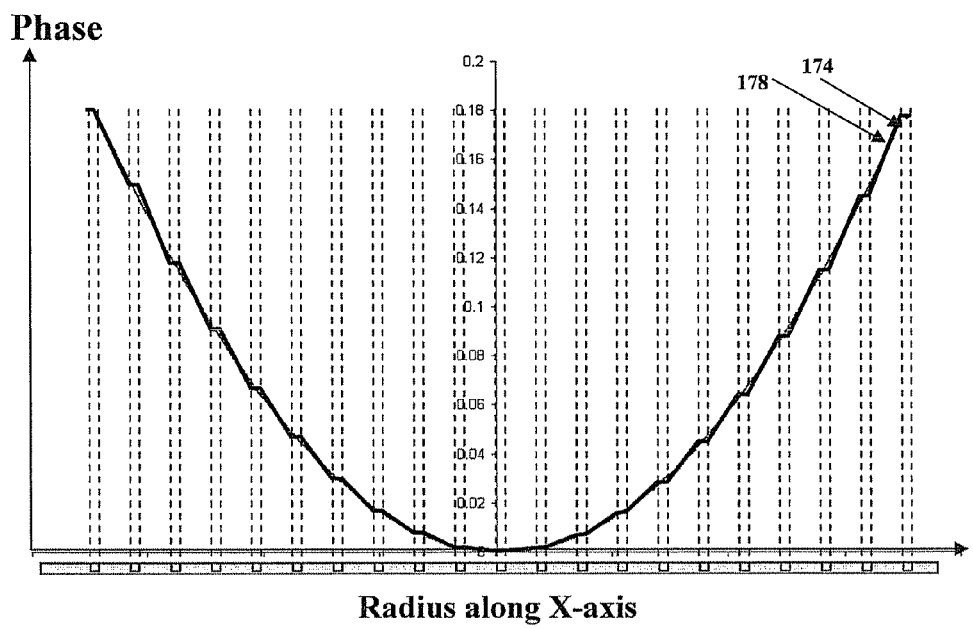
FIGS. 8B and 8C show optical phase profiles of an ideal higher order aberration correction and the correction provided along two different radial cross-sections of the lens of FIG. 6A having the patterned electrode layer of FIG. 8A.
Figure 8C:
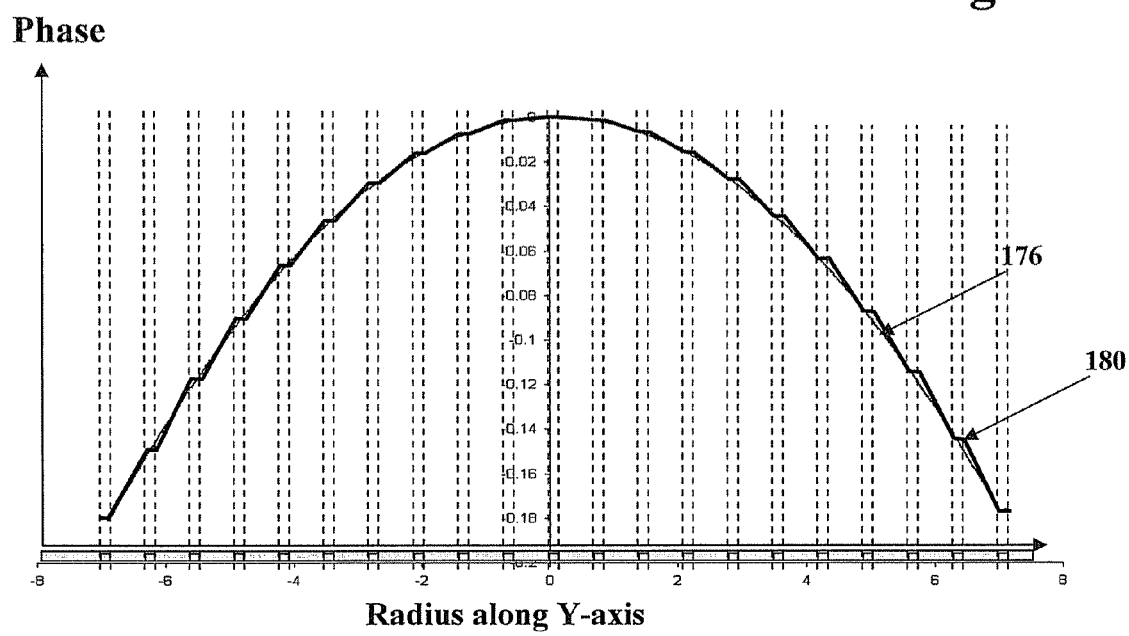

FIGS. 8B and 8C show optical phase profiles of an ideal correction for a radially asymmetric aberration of an eye and the correction provided by the lens of FIG. 8A for two different radial cross-sections of the lens. The aberration is a Zernike (2,2) aberration, which is known. The profile of the aberration wavefront has four-fold roto-inversion symmetry (i.e., the profile along the x-axis is negative the profile along the y-axis).

Two views are shown in FIGS. 8B and 8C because, since the aberration is radially asymmetric, the ideal correction thereof is also radially asymmetric. The result is that different corrections are needed for different radial positions. FIG. 8B shows optical phase profile along an x-axis and FIG. 8C shows optical phase profile along a y-axis, the axes representing an arbitrary orthogonal pair.

FIG. 8B shows a first ideal aberration correction 174 and FIG. 8C shows a second ideal aberration correction 176 in the two respective views of the figures.

FIG. 8B shows a third correction 178 provided by the lens of FIG. 8A measured across the cross-section of the lens in the view of FIG. 8B. FIG. 8C shows a fourth correction 180 provided by the lens of FIG. 8A measured across the cross-section of the lens in the view of FIG. 8C.

The lens according to FIG. 8A for correcting aberrations includes a plurality of pixelated electrodes 162. When voltage is applied to the plurality of pixelated electrodes 162 of FIG. 8A, FIGS. 8B and 8C show that, in the space between adjacent pixelated electrodes, the optical phase profile of the third and fourth corrections 178 and 180 is linear. The resistive layer allows the third and fourth corrections 178 and 180 to more closely approximate the first and second ideal aberration corrections 174 and 176, respectively, in the space between adjacent pixelated electrodes, along their respective cross-sections of the lens.

In the space occupied by the pixelated electrodes themselves, the corrections may not match. Accordingly, the sizes of the pixelated electrodes are minimized to reduce the deviation from the ideal corrections.

It may be appreciated that the Zernike (2,2) aberration is used as an example and that any other aberration having any degree of rotational asymmetry may have been similarly used. It may also be appreciated that the two different views of optical phase profiles are demonstrative of further possible variation of optical phase profile at each different view.

The change in pupil size and the change in ambient light are inversely (but not necessarily linearly) proportional. In one example, the amount of correction for the de-focusing effect of spherical aberration typically increases when the sensor senses an increase in pupil size. Accordingly, the degree of spherical aberration correction typically increases when the sensor senses a decrease in ambient light. For example, in photopic conditions (bright light conditions), the spherical aberration correction may be completely turned off (i.e., approximately zero correction/power may be used). In scotopic conditions (extreme low light), the lens may provide full spherical aberration correction (i.e., maximum correction/power may be necessary). In another example, the degree of spherical aberration correction decreases when the sensor senses a decrease in pupil size. Accordingly, the degree of spherical aberration correction decreases when the sensor senses an increase in ambient light.

Although the above example describes correcting changing spherical aberrations of the eye, it may be appreciated by those skilled in the art that the lens 100 of FIG. 6A, e.g., using the pixelated electrodes 162 of FIG. 8A, may correct any changing aberration, in general, e.g., including higher order aberrations. Some high-order aberrations may be present at small pupil diameters, and a constant correction may be appropriate. Other high-order aberrations, such as spherical aberration, may be dependent on the pupil diameter or on the level of accommodation of the eye and may require a dynamic correction that varies with light level and/or accommodation level.

The higher order aberrations of the eye's optics may be measured by an aberrometer (i.e., a wavefront analyzer) for a plurality of pupil sizes (i.e., in a plurality of ambient lighting conditions) and/or levels of accommodation. The aberrometer determines a plurality of different lens corrections, each predetermined to negate the measured higher order aberrations for one of the plurality of pupil sizes and/or levels of accommodation. The aberrometer may provide this information to a controller program, which in turn determines a plurality of different values for voltages corresponding to the different pupil sizes, ambient lighting conditions and/or levels of accommodation. The plurality of different voltages are stored in a memory of the controller. Instructions to apply these voltages to the electrode rings and/or pixelated electrodes when the sensor senses the corresponding lighting condition are also stored in a memory of the controller. During operation of the lens, when the sensor senses a pupil size, an ambient lighting condition and/or a level of accommodation, the controller retrieves from memory the voltage value (s) corresponding thereto or closest thereto. This voltage value is predetermined to correct the higher order aberrations due to the sensed data. The controller applies the voltages having the values retrieved from memory to the electrode rings and/or pixelated electrodes of the lens. The applied voltages cause optical phase patterns or map to generate the lens correction for negating the measured higher order aberration for the pupil size, ambient lighting conditions and/or levels of accommodation closest to the sensed data. Although the above example utilizes the method of using predetermined voltage values, more complex algorithms may be utilized to calculate the voltage levels for each unique profile required on a demand basis.

An embodiment of the invention not shown in the figures includes manufacturing the lens 100 of FIG. 6A. In the embodiments described in reference to FIGS. 6B and 6E, the plurality of electrode rings of the patterned electrode layers may be manufactured by initially forming a flat conductive layer on top of an insulating substrate layer. The conductive layer may be composed of, e.g., ITO. The substrate layer may be composed of, e.g., quartz silicon. Other materials may be used. In one approach, a solid layer of conductive material may be deposited, e.g., by a sputtering process, on a surface of the substrate layer. The conductive layer may be etched, e.g., using a lithography process, leaving the desired shape and arrangement of patterned electrodes. For example, relatively thin rings (e.g., approximately 1% of the surface area) of the conductive material may be removed to form the electrode rings 104a of FIG. 6B, while relatively thick rings (e.g., approximately 99% of the surface area) of the conductive material may be removed to form the electrode rings 104b of FIG. 6E. In the embodiment described in reference to FIG. 8A, the pixelated electrodes 162 may be manufactured by depositing small spots of conductive material (e.g., composed of ITO) on a surface of an insulating substrate layer (e.g., composed of quartz silicon). The conductive material may be fabricated, e.g., using a using a deposition and lithography process.

In the embodiment described in reference to FIG. 6B, insulating rings 154 are formed between the electrode rings 104a. The insulating rings are formed by removing the conducting layer to expose underlying insulating substrate. The process may include, first coating the entire surface of the substrate layer with a thin conducting layer of ITO. The ITO may then be etched away to form the conductive electrode rings separated by gaps. The gaps form the insulating rings.

In the embodiment described in reference to FIGS. 6E and 8A, the resistive layer 156 is grown over the electrode rings 104b and the pixelated electrodes 162, respectively. The resistive layer may be composed of, e.g., PEDOT:PSS, although other materials may be used. A thin layer of silicon dioxide may be used to passivate the resistive layer, i.e., to protect and isolate the resistive layer from the environment. An alignment layer may be deposited, e.g., over the layer of silicon dioxide. The alignment layer may be composed of, e.g., polyimide, although other materials may be used.

FIGS. 9A-9F show front views of the lens 100 of FIG. 6A having a fixed lens region 118 in optical communication with the electro-active region 102 for correcting higher order aberrations of the eye. The electro-active region 102 may include, in three different embodiments, the electrode rings 104a described in reference to FIG. 6B, the electrode rings 104b described in reference to FIG. 6E, or the pixelated electrodes 162 described in reference to FIG. 8A. The electrode rings 104a or 104b described in reference to FIG. 6B or 6E, respectively, are typically used to correct spherical aberration of the eye, while the pixelated electrodes 162 of FIG. 8A, are typically used to correct all types of higher order aberrations of the eye, namely the entire distorted wavefront or alternatively a portion not otherwise corrected by conventional spherical and cylindrical lenses.

The fixed lens region 118 provides a fixed optical power to the lens. The fixed lens region extends radially to occupy the full view of the lens. Alternatively, the fixed lens region is spaced from at least a portion of the peripheral edge. The fixed lens region may include any lens, e.g., refractive, diffractive, surface relief diffractive, spherical, cylindrical, aspherical, plano, convex, concave, single-focus, multi-focus, bifocal, trifocal, progressive addition, near distance, far distance, intermediate distance, or any combination thereof depending on the optical effects sought to be achieved. The fixed lens region and the electro-active lens region can provide any combination of spherical, cylindrical, and aspherical power depending on the optical effects sought to be achieved.

Typically, when no electrical power is applied to the electro-active region 102, the electro-active region provides no additional optical power to the lens. For example, when no voltage is applied to the electro-active region, the refractive index thereof matches the refractive index of the fixed lens region, and thus does not alter the optical properties thereof. The electro-active region 102 typically extends radially towards at least a portion of the peripheral edge of the lens or, alternatively, is spaced from the peripheral edge.

The lens 100 has a geometric center 146. The lens 100 has a fitting point 144. The fitting point of the lens is a reference point that represents the approximate location of the wearer's pupil when looking straight ahead through the lens. The fitting point is usually, but not always, located 2-5 mm vertically above the geometric center of the lens. This point or cross is typically marked on the lens surface such that it can provide an easy reference point for measuring and/or double-checking the fitting of the lens relative to the pupil of the wearer. The mark is easily removed upon the dispensing of the lens to the patient/wearer.

Figure 9A:
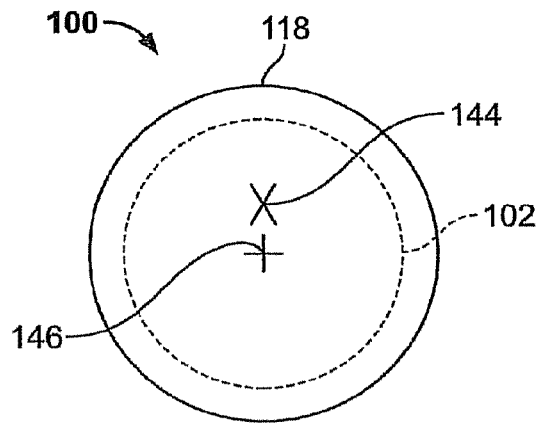
FIG. 9A shows a front view of the lens of FIG. 6A having a circular electro-active region that is centered with the geometric center of the lens.
Figure 9B:
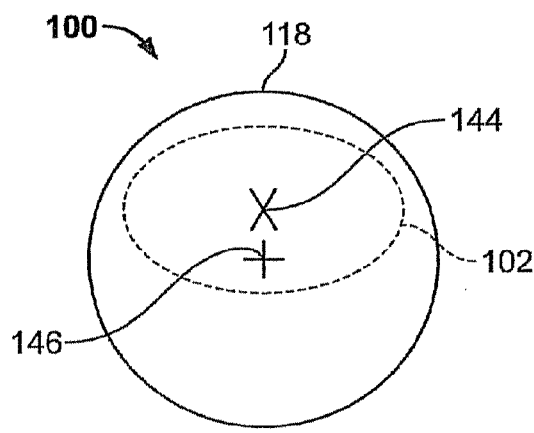
FIG. 9B shows a front view of the lens of FIG. 6A having an elliptical electro-active region that is concentric with the fitting point of the lens.
Figure 9C:
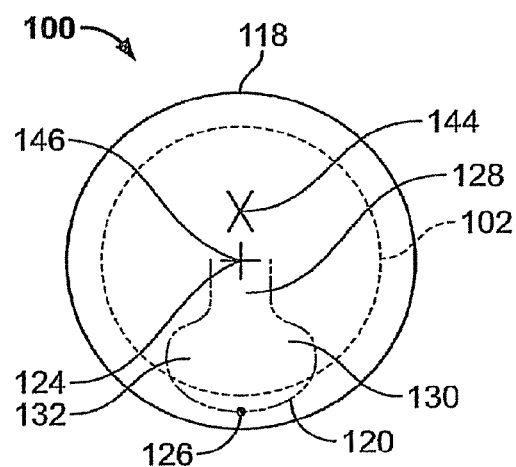
FIGS. 9C and 9D show front views of the lenses of FIGS. 9A and 9B, respectively, having a progressive addition region, where at least a portion of the progressive addition region is in optical communication with the electro-active region.
Figure 9D:
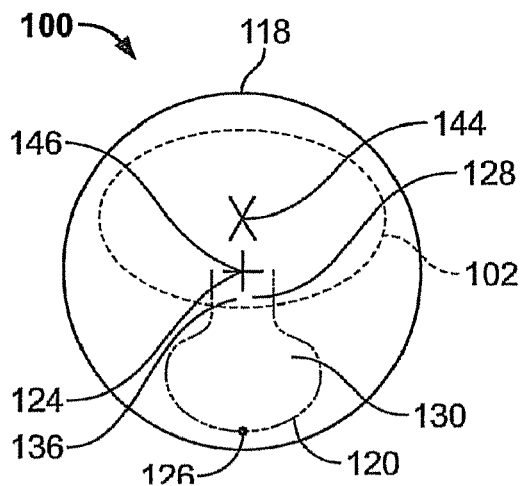
Figure 9E:
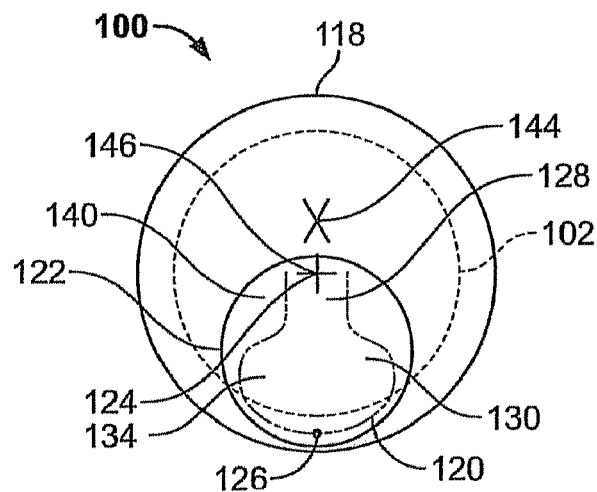
FIGS. 9E and 9F show front views of the lenses of FIGS. 9C and 9D, respectively, having a second electro-active region for correcting low order aberrations, where at least a portion of the second electro-active region is in optical communication with the progressive addition region.

In FIGS. 9A, 9C, and 9E, the electro-active region 102 is circularly shaped. When the electro-active region is formed from circular electrode rings (e.g., as described in reference to FIGS. 6B and 6E), the electrode rings may be concentric with the geometric center 146 of the lens. The diameter of the largest of the circular electrode rings is in a range of from approximately 10 mm to approximately 20 mm. When the electro-active region 102 is formed from pixelated electrodes (e.g., as described in reference to FIG. 8A), the pixelated electrodes may be arranged in a grid having a circular boundary or, alternatively, along circular orbits concentric with the geometric center 146 of the lens.

Figure 9F:
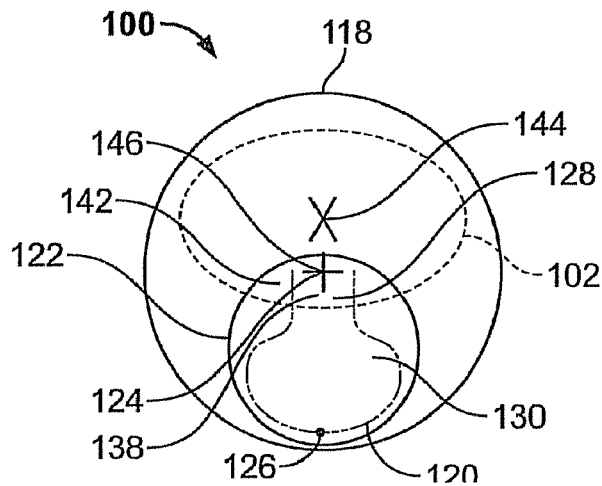

In FIGS. 9B, 9D, and 9F, the electro-active region 102 is elliptically shaped. When the electro-active region is formed from circular electrode rings (e.g., as described in reference to FIGS. 6B and 6E), the electrode rings may be concentric with the fitting point 144 of the lens. The electrode rings are circularly shaped and are cropped to form the elliptically shaped electro-active region When the electro-active region is formed from pixelated electrodes (e.g., as described in reference to FIG. 8A), the pixelated electrodes may be arranged in a grid having an elliptical boundary or, alternatively, along elliptical orbits that are centered at the fitting point of the lens. The large axis of the elliptical electro-active region is in a range of from approximately 10 mm to approximately 20 mm. The small axis is in a range of from approximately 5 mm to approximately 10 mm.

In an alternative embodiment not shown in the figures, the electro-active region may have any shape, e.g., hyperbolic, parabolic, etc. When the electro-active region is formed from circular electrode rings, the electrode rings may be cropped in a design having any shape. When the electro-active region is formed from pixelated electrodes, the pixelated electrodes may be arranged in a grid having a boundary of any shape.

In FIGS. 9C-9F, the lens 100 includes a progressive addition region 120. The progressive addition region provides a gradient of continuously increasing positive optical power that extends from a starting point 124 of a far distance viewing zone 128 (e.g., in the top-most half of the lens) of the lens to an ending point 126 of a near distance viewing zone 130 (e.g., in the lower portion of the lens) of the lens. This progression of optical power generally starts at approximately the fitting point of the lens and continues until the full add power is realized in the near distance viewing zone. Typically, the optical power then plateaus. Typically, the progressive addition region has a variable curvature surface on one or both outer surfaces of the lens (not shown) that is shaped to create this progression of optical power.

The lenses of FIGS. 9C and 9E have regions 132 and 134, respectively, where the electro-active region 102 is in optical communication with at least a portion, and preferably most, of the progressive addition region 120. For example, the electro-active region is in optical communication with the far distance viewing zone 128 and the near distance viewing zone 130 of the progressive addition region.

The lenses of FIGS. 9D and 9F have regions 136 and 138, respectively, where the electro-active region 102 is in optical communication with at least a portion, and preferably a small portion, of the progressive addition region 120. For example, the electro-active region is in optical communication with only the far distance viewing zone 128 of the progressive addition region.

In FIGS. 9C-9F, the electro-active region 102 typically provides higher order aberration correction and the progressive addition region 120 provides the near (reading zone) optical power to provide the wearer's total optical power correction.

In FIGS. 9E and 9F, the lens 100 further includes a multi-focal optic 122. The multi-focal optic is typically in optical communication with some, and preferably all, of the progressive addition region 120. The multi-focal optic provides optical power replacing, in part, power provided by the progressive addition region. By decreasing the power of the progressive addition region, the optical aberration associated therewith likewise decrease. The multi-focal optic may be an electro-active optic or a fixed optic.

The lens of FIG. 9E has a region 140 where the multi-focal optic is in optical communication with a portion, and preferably most, of the electro-active region 102. For example, the multi-focal optic is in optical communication with the far distance viewing zone 128 and the near distance viewing zone 130 of the progressive addition region.

The lens of FIG. 9F has a region 142 where the multi-focal optic is in optical communication with a portion, and preferably a small portion, of the electro-active region 102. For example, the multi-focal optic is in optical communication with only the far distance viewing zone 128 of the progressive addition region.

In an embodiment of the present invention (not shown in the figures) for correcting a spherical aberration of the eye, the fixed lens region may provide an optical power that varies (increasing or decreasing) radially from the center of the lens. In an example, a first region of the fixed lens region extending 3 mm from the center of the lens provides zero D of optical power, a second region of the fixed lens region extending from 3 mm to 4.5 mm from the center of the lens provides −1.00 D of optical power, and a third region of the fixed lens region extending from 4.5 mm to 6 mm from the center of the lens provides −2.00 D of optical power. The electro-active region is a flat continuous electrode layer. The electro-active region adds a uniform spherical power across the full field of the electro-active region. The combined varying optical power of the fixed lens region and the uniform spherical power of the electro-active region is provided to negate a spherical aberration in the eye. For example, when the pupil radius is less than 3 mm, and constricted to the first region, the electro-active region provides no spherical power. When the pupil radius is 4 mm (the pupil covers the first region and partially overlaps the second region) the uniform spherical power of the electro-active region is in a range of from zero D of the first region to −1.00 D of the second region, and preferably an average therebetween of −0.50 D. When the pupil radius is 5 mm (the pupil covers the first and second regions and partially overlaps the third region), the uniform spherical power of the electro-active region is in a range of from −1.00 D of the second region to −2.00 D of the third region, and preferably an average therebetween of −1.00 D. Although three regions and optical powers and specific dimensions thereof are described, alternatively any other number of regions, optical powers and dimensions (up to the maximum opening size of the pupil) may be used according to the present invention.

In another embodiment not shown in the figures, the lens of the present invention may be, for example, an intra-ocular lens, a corneal in-lay, a corneal on-lay, a contact lens, and/or a spectacle lens. The correction region for higher order aberration is typically located along the optical axis of the lens. When the lens is a contact lens, intra-ocular lens, corneal in-lay or a corneal on-lay, the optical axis of the lens stays positioned with respect to the optical axis of the eye. Thus, the lens corrects higher order aberration of the eye regardless of the rotation of the eye.

However, in the aforementioned example, in which the lens of the present invention is a spectacle lens (i.e., the lens is set in a spectacle frame), the lens has a stationary optical axis. When the eye rotates with respect to the optical axis of the lens, the correction applied to the eye may be improper. To overcome this problem, in one approach, the spectacle frame includes a gaze detector (not shown) that detects the direction of a wearer's gaze. Since the electro-active region provides higher order aberration correction in the lens, when a user's gaze is directed outside of the electro-active region, the lens cannot provide proper higher order aberration correction. Thus, when the gaze detector detects a deviation of gaze direction away from the optical axis of the lens, the electro-active region of the lens is turned off. In another approach, the electro-active region may be extended (e.g., using pixelated electrodes) to provide moving higher order aberration correction across the lens. When a sensor senses movement in the direction of the user's gaze, a controller translates the voltages applied to the pixelated electrodes spatially across the lens to cause a new phase profile correction that remains centered with respect to the new direction of the user's gaze. In this approach, the lens provides accurate higher order aberration correction for a moving eye (i.e., for each of a plurality of different gaze directions). In one example, the gaze detector measures the direction of the user's gaze and sends the information to an integrated circuit (IC) chip (not shown) to control the voltages multiplexed to each of the pixelated electrodes. In order to accommodate a voltage pattern that translates across the lens, the number of pixelated electrodes and the size of the electro-active region may be increased, e.g., based on the range of gaze angles the lens accommodates.

It is noted that the lens of the present invention provides many benefits, one of which includes providing an alternative to using 'spherical equivalence' along with additional minus power, a leading approach in the current state of the art for reducing spherical aberration of the eye.

Figure 1:
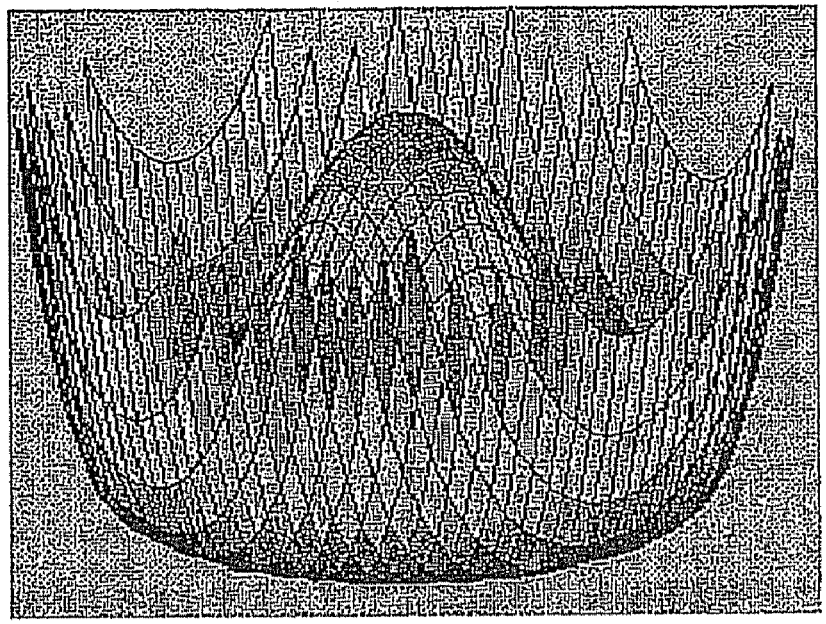
FIG. 1 is a graph of a wavefront exhibiting spherical aberration as defined by equation (1).
Figure 2:
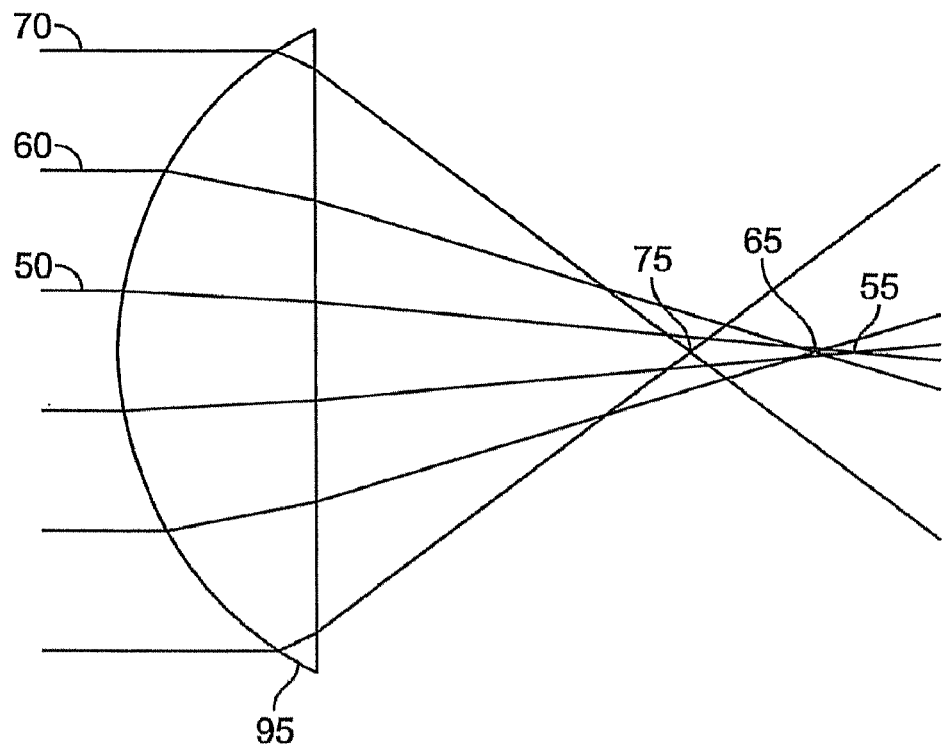
FIGS. 2-5 show side views of the focusing of light rays by a lens of an eye, having openings of different diameters.

As shown in FIG. 1, de-focus due to spherical aberration of the eye typically increases (in absolute value) radially from the center of the eye. Thus, when using additional spherical power to negate spherical aberration near the peripheral edge of the pupil, the power of the lens correction is greater in absolute value than the ideal correction to negate spherical aberration near the center of the pupil. Applying the additional spherical power near the center of the pupil, where such correction is not needed, would cause unwanted distortion. Similarly, applying the smaller spherical aberration correction near the peripheral edge of the pupil would not correct the existing distortion of the eye attributed to spherical aberration. To mediate the different corrections needed to reduce distortions at different radii of the eye, conventional lenses use a spherical equivalent additional power that is typically halfway between 0 and the maximum power required to correct the spherical aberration at large pupil diameters.

Spherical equivalence is an approach in which a clinician prescribes a lens having a spherical power prescription that is greater or less than needed, in order to negate some distortion caused by non-spherical aberrations. This technique is typically used in contact lenses to correct for astigmatism. Some clinicians also apply this technique to eliminate distortion caused by spherical aberration when the pupil diameter is large. For example, if a patient has approximately −½ D of spherical aberration near the peripheral edge of the pupil and approximately zero D of spherical aberration near the center of the pupil, a spherically equivalent lens may provide an additional −¼ D of sphere across the entire lens surface. The result is a lens that has too much spherical power near the center of the lens and too little spherical aberration correction near the peripheral edge of the lens.

Despite the problem of imprecise correction, spherically equivalent lenses may have some benefits. Compared with lenses that provide optimal correction only when the user's gaze is aligned with the optical axis of the lens, spherically equivalent lenses typically provide reasonable correction for an eye gazing in all directions. Another advantage is that spherically equivalent lenses have been shown in some cases to improve night vision, e.g., see references, Amos, J. F. (1987). *Diagnosis and Management in Vision Care*, Butterworths; Hope, G. M. and M. I. Rubin (1984). "Night myopia." Surv. Opthalmology 29: 129-136; Owens, D. A. and H. W. Leibowitz (1976). "Night myopia: cause and a possible basis or amelioration." Am. J. Optometric Physiol. Opt. 53: 709-717; Richards, O. W. (1967). "Night Myopia at Night Automobile Driving Luminances." Am. J. Optometry, Arch. Am. Acad. Optometry 44: 517-523; Richards, O. W. (1978). "Night myopia at night automobile luminances: Final report." Am. J. Optometric Physiology Opt. 55: 469-470; and Sorsby, A. (1963). *Modern Opthalmology*. London, Butterworths.

A disadvantage of spherically equivalent lenses is that they provide more minus power than is needed for correction during photopic conditions when the pupil diameter is small. Thus, these lenses are usually prescribed strictly for night wear.

An advantage of lenses described according to the present invention is that, when using a hybrid lens, normal spherical de-focus may be corrected by a conventional lens portion, and spherical aberration at large pupil radii may be corrected by an electro-active lens portion activated during low-light conditions.

It is further noted that the lens of the present invention provides the additional benefit of correcting residual de-focus effects commonly uncorrected by conventional lenses. Conventional lenses are typically commercially available only at interval optical powers (e.g., at intervals of ¼ D). Residual de-focus is a small optical power differential between a user's ideal correction and the closest commercially available optical power correction.

What is claimed is:
1. A lens, comprising:
  a. a substrate;
  b. a first electrode layer positioned upon the substrate, the first electrode layer including at least three adjacent concentric electrode rings, each of the at least three adjacent concentric electrode rings separated from one another by a resistive material; and
  c. a uniform electrode layer in a first plane spaced from and parallel to a second plane of the concentric electrode rings, wherein a resistance of the resistive material is in a range of from 0.1 Mega-Ohms per square to 100 Mega-Ohms per square, and wherein when a voltage is applied across the concentric electrode rings and the uniform electrode layer, a phase profile between adjacent pairs of electrodes of the concentric electrode rings is substantially linear.

2. The lens of claim 1, wherein the lens is configured such that, when different voltages are applied to a plurality of the electrode rings, the optical phase profile of the lens can closely approximate an optical phase of ideal spherical aberration correction for a human eye looking through the lens.

3. The lens of claim 2, wherein the lens is configured such that a first set of different voltages can be applied to the plurality of electrode rings to cause a first change in the refractive index of the lens for correcting a first order aberration of the eye, and a second set of different voltages can be applied to the plurality of electrode rings to cause a second change in the refractive index of the lens for correcting a second order aberration of the eye corresponding to a change in pupil size of the eye.

4. The lens of claim 1, wherein a radial width of each electrode ring is approximately 10 microns or less.

5. The lens of claim 1, wherein a radial width of each one of the electrode rings is at least 10 times smaller than a radial width of each one of rings of the resistive material separating the electrode rings.

6. The lens of claim 1, wherein a resistance of the resistive material is significantly greater than a resistance of the electrode rings.

7. The lens of claim 1, wherein a resistance of the electrode rings is less than 200 Ohms per square.

8. The lens of claim 1, wherein the resistance of the substrate layer is greater than approximately 1000 Mega-Ohms per square.

9. The lens of claim 1, wherein the electrode rings of electrodes are composed of indium tin oxide (ITO).

10. The lens of claim 1, wherein the resistive material is composed of poly(3,4-ethylenedioxythiophene) (PEDOT).

11. The lens of claim 1, wherein the substrate is composed of quartz silicon.

12. The lens of claim 1, wherein at least part of an area defined by the first electrode layer is in optical communication with a progressive addition region of the lens.

13. The lens of claim 1, wherein a plurality of substantially linear phase profile segments associated with a plurality of adjacent concentric electrode rings, approximates a non-linear continuous curve corresponding to an ideal optical correction.

14. A lens for correcting spherical aberration, comprising:
a uniform electrode layer in a first plane; and
at least three adjacent concentric electrode rings in a second plane spaced apart from and parallel to the first plane, each of the at least three adjacent concentric electrode rings separated from one another in the second plane by a resistive material,
wherein a resistance of the resistive material is in a range of from 0.1 Mega-Ohms per square to 100 Mega-Ohms per square, and
wherein the lens is configured such that, when different voltages are applied to a plurality of the electrode rings, an optical phase profile between adjacent electrode rings closely approximates an optical phase profile of ideal spherical aberration correction for a human eye.

15. The lens of claim 14, further comprising a layer of the resistive material covering the electrode rings.

16. The lens of claim 14, wherein, in the second plane, adjacent electrode rings are spaced by a distance that is substantially greater than a distance between the first and second planes.

17. The lens of claim 14, wherein the optical phase profile between adjacent electrode rings is linear.

18. The lens of claim 14, wherein the optical phase profile of the lens is changed between a first state and a second state, wherein the first optical phase state approximates the optical phase of an ideal spherical aberration correction due to relatively low ambient light and the second optical phase state approximates the optical phase of an ideal spherical aberration correction due to relatively high ambient light.

19. The lens of claim 14, included in a lens system further comprising:
a sensor for sensing a change in ambient light; and
a controller,
wherein, the lens system is configured such that when the sensor senses a change in ambient light, the controller changes the voltage applied to the plurality of electrode rings to change the optical phase profile between adjacent electrode rings to closely approximate the optical phase of ideal spherical aberration correction due to the sensed change in ambient light.

20. The lens of claim 19, wherein the changed optical phase profile of the lens causes the lens to cancel spherical aberration of an eye due to the sensed change in ambient light.

21. The lens of claim 14, wherein at least part of an area defined by the uniform electrode layer is in optical communication with a progressive addition region of the lens.

22. The lens of claim 14, wherein the lens is configured such that a first set of different voltages can be applied to the plurality of electrode rings to cause a first change in the refractive index of the lens for correcting a first order aberration of the eye, and a second set of different voltages can be applied to the plurality of electrode rings to cause a second change in the refractive index of the lens for correcting a second order aberration of the eye corresponding to a change in pupil size of the eye.

23. A lens, comprising:
a. a uniform electrode layer; and
b. a patterned electrode layer spaced from the uniform electrode layer,
wherein the patterned electrode layer has at least three adjacent concentric electrode rings and is coated with a resistive material, the resistive material separating each of the at least three adjacent concentric electrode rings from one another,
wherein adjacent electrode rings are spaced by a distance that is substantially greater than the distance of the space between the electrode layers,
wherein a resistance of the resistive material is in a range of from 0.1 Mega-Ohms per square to 100 Mega-Ohms per square, and
wherein the lens is configured such that, when a voltage is applied across the electrode layers the optical phase profile of the lens is substantially constant across each of the electrode rings, changes approximately linearly between adjacent electrode rings, and approximates an optical phase profile of ideal spherical aberration correction.

24. The lens of claim 23, wherein adjacent electrode rings are spaced by a distance that is at least 10 times greater than the distance of the space between the electrode layers.

25. The lens of claim 23, wherein at least part of an area defined by the patterned electrode layer is in optical communication with a progressive addition region of the lens.

26. The lens of claim 23, wherein the lens is configured such that a first set of different voltages can be applied to a plurality of the electrode rings to cause a first change in the refractive index of the lens for correcting a first order aberration of a human eye, and a second set of different voltages can be applied to the plurality of the electrode rings to cause a second change in the refractive index of the lens for correcting a second order aberration of the eye corresponding to a change in pupil size of the eye.

* * * * *